(12) United States Patent
Bugga et al.

(10) Patent No.: US 10,439,212 B2
(45) Date of Patent: Oct. 8, 2019

(54) ALUMINUM BORATE COATED LITHIUM ION CATHODE MATERIALS

(71) Applicant: California Institute of Technology, Pasadena, CA (US)

(72) Inventors: Ratnakumar V. Bugga, Arcadia, CA (US); Candace S. Seu, La Jolla, CA (US)

(73) Assignee: CALIFORNIA INSTITUTE OF TECHNOLOGY, Pasadena, CA (US)

(*) Notice: Subject to any disclaimer, the term of this patent is extended or adjusted under 35 U.S.C. 154(b) by 285 days.

(21) Appl. No.: 15/206,080

(22) Filed: Jul. 8, 2016

(65) Prior Publication Data

US 2017/0012284 A1    Jan. 12, 2017

Related U.S. Application Data

(60) Provisional application No. 62/190,916, filed on Jul. 10, 2015.

(51) Int. Cl.
| | | |
|---|---|---|
| *H01M 4/36* | (2006.01) | |
| *H01M 10/0525* | (2010.01) | |
| *H01M 4/62* | (2006.01) | |
| *H01M 4/505* | (2010.01) | |
| *H01M 4/525* | (2010.01) | |

(52) U.S. Cl.
CPC .......... *H01M 4/366* (2013.01); *H01M 4/505* (2013.01); *H01M 4/525* (2013.01); *H01M 4/628* (2013.01); *H01M 10/0525* (2013.01)

(58) Field of Classification Search
None
See application file for complete search history.

(56) References Cited

U.S. PATENT DOCUMENTS 5,474,861 A * 12/1995 Bito ............ H01M 4/131
429/221
2014/0087270 A1 * 3/2014 Yoshida ............ H01M 4/485
429/304

* cited by examiner

*Primary Examiner* — Maria Laios
(74) *Attorney, Agent, or Firm* — Mintz, Levin, Cohn, Ferris, Glovsky and Popeo, P.C.

(57) ABSTRACT

Composite cathode materials are provided herein. Disclosed composite cathode materials include those comprising an aluminum borate coating. Systems making use of the cathode active materials are also described, such as electrochemical cells and electrodes for use in electrochemical cells. Methods for making and using the composite cathode materials are also disclosed.

18 Claims, 20 Drawing Sheets ically achieve these capacities. The present invention

ALUMINUM BORATE COATED LITHIUM ION CATHODE MATERIALS

CROSS-REFERENCE TO RELATED APPLICATIONS

This application claims the benefit of and priority to U.S. Provisional Application No. 62/190,916, filed Jul. 10, 2015, which is hereby incorporated by reference in its entirety for all purposes.

STATEMENT REGARDING FEDERALLY SPONSORED RESEARCH OR DEVELOPMENT

The invention described herein was made in the performance of work under a NASA contract NNN12AA01C, and is subject to the provisions of Public Law 96-517 (35 USC 202) in which the Contractor has elected to retain title.

BACKGROUND

Improving energy storage and transport capabilities may be useful as society becomes more and more based on renewable energy sources. A problem in the development of next generation lithium-ion batteries is to develop improved cathode materials with increased energy storage capacities. A number of high specific capacity cathode materials (e.g., greater than 220 mAh/g) have been developed. However, these materials have yet to be adopted in commercial cells due to multiple technical barriers, including voltage and power fade during cycling, poor power characteristics, and modest cycle life at the high charging voltage (>4.5 V) necessary to achieve these capacities. The present invention provides solutions to a number of these technical barriers.

BRIEF SUMMARY

The present description provides composite cathode materials that are useful in a variety of electrochemical cells, including lithium-ion batteries and lithium batteries. The composite cathode materials may include a cathode active material and a metal borate compound coating the cathode active material.

The composite cathode materials disclosed herein are useful for making cathodes for electrochemical cells, and methods for making composite cathode materials are also provided herein. For example, in some embodiments, a method of making a composite cathode material comprises forming a reaction mixture by adding a cathode active material, a cation precursor, and an anion precursor to a solvent to initiate a precipitation reaction between the cation precursor and the anion precursor to form the composite cathode material, such as a composite cathode material that comprises a cathode active material and a metal borate coating on the cathode active material. In some embodiments, the cation precursor comprises a metal salt. In some embodiments, the anion precursor comprises borate anions.

Electrochemical cells and methods for making electrochemical cells are also provided herein. In some embodiments, an electrochemical cell comprises an anode, a cathode, a separator positioned between the anode and the cathode, and an electrolyte positioned between the anode and the cathode and in contact with the separator, with the cathode comprising a composite cathode material described herein in which a metal borate coating is provided over a cathode active material. In some embodiments, a method of making an electrochemical cell comprises making a composite cathode material, such as using the methods described herein in which a metal borate coating is formed on a cathode active material, forming the composite cathode material into an electrode, and assembling an electrochemical cell using the electrode as a cathode. Methods of some embodiments of assembling an electrochemical cell may comprise applying an electrolyte on a cathode, positioning a separator adjacent to the cathode and in contact with the electrolyte, applying additional electrolyte to the separator, and positioning an anode adjacent to the separator and in contact with the electrolyte. It will be appreciated that alternative methods of assembling an electrochemical cell are contemplated in which the order of assembly may be different but in which the resultant electrochemical cell component arrangement is the same (i.e., cathode adjacent to separator adjacent to anode, with electrolyte wetting the separator and/or in contact with the cathode and/or the anode).

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

DETAILED DESCRIPTION

I. General

Figure 1:
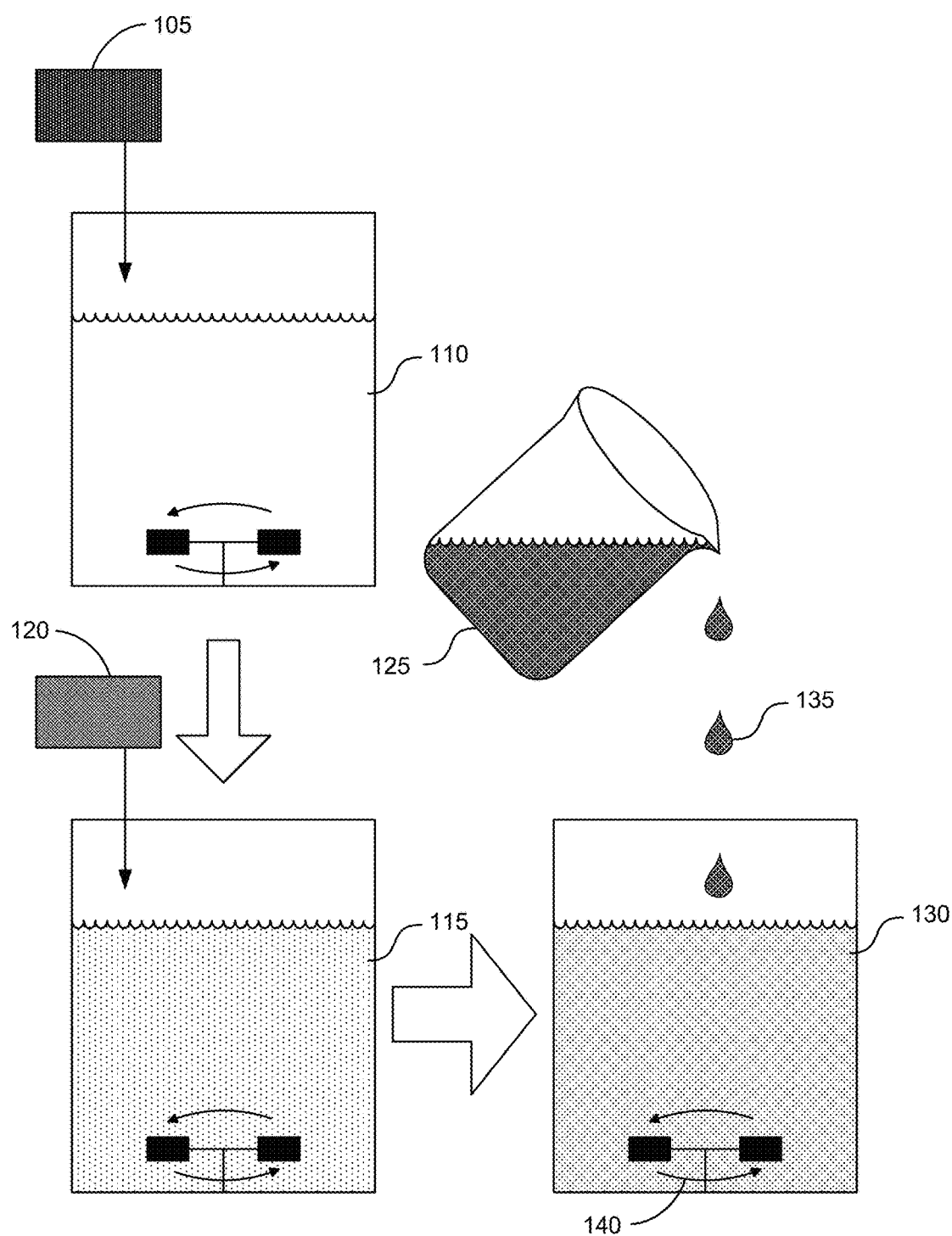
FIG. 1 provides a schematic overview of a method of making a composite cathode material in accordance with some embodiments.

The present invention relates generally to composite cathode materials that may, for example, be used in electrochemical cells. The composite cathode materials of some embodiments may include a cathode active material and a metal borate coating, such as $AlBO_3$. In some embodiments, inclusion of the metal borate coating in the composite cathode material may advantageously provide an electrochemical cell including the composite cathode material with the ability to be charged to voltages greater than about 4.2 volts without destroying or significantly degrading an electrolyte in the electrochemical cell, such as by oxidative degradation or formation of a surface layer termed as a solid electrolyte interface. In some embodiments, the electrolyte may still undergo some oxidative degradation even though the composite cathode material includes a metal borate coating over the cathode active material, but the rate of oxidative degradation or surface electrolyte interface formation may be less or substantially less than that of a similar electrochemical cell lacking the metal borate coating on the cathode active material or a similar electrochemical cell having another coating over the cathode active material, such as a metal oxide coating, a metal phosphate coating, or a metal fluoride coating.

In fact, the inventors have surprisingly found that including a metal borate coating, such as an $AlBO_3$ coating, on the cathode active material results in a dramatic and unexpected reduction of the rate of electrolyte degradation as compared to the bare cathode active material or the cathode active material having a comparable metal phosphate or metal fluoride coating when the cathode active material is charged at a voltage greater than about 4.2 V (vs. lithium). The metal borate coated cathode materials also advantageously and surprisingly exhibit substantially longer cycle lives higher capacities than the bare cathode active material or than metal phosphate or fluoride coated cathode active materials. For example, exemplary electrochemical cells of some embodiments may exhibit discharge capacities greater than 200 mAh/g for 100 or more charge-discharge cycles, as evidenced in laboratory cells. The enhanced capacities of the metal borate coated cathode active materials, as compared to the bare or metal phosphate or fluoride coated cathode active materials, are particularly evident at high discharge rates, such as discharge rates of 1 C or 2 C.

Electrochemical cells including the metal borate coated cathode materials also may reduce the complexity of the electrochemical cell, as film-forming electrolyte additives may not be required due to the presence of the metal borate coatings. Some embodiments, however, may still include electrolyte additives to further enhance the capacity and/or cycle life of the electrochemical cell.

Techniques are also described herein for making composite cathode materials, such as a composite cathode comprising a cathode active material and a metal fluoride compound coating the cathode active material. The disclosed techniques make use of a controlled precipitation reaction between a cathode precursor and an anode precursor in the presence of suspended cathode active material particles. Advantageously, the disclosed techniques allow for formation of thin, uniform, conformal coatings of metal borate compound over a cathode active material, which does not impart significant differences in conductive or aggregating properties of the cathode active material, but which does provide the capacity and electrolyte reactivity enhancements described previously.

II. Definitions

"Electrochemical cell" refers to a device that produces electrical energy through chemical reactions. Example electrochemical cells include batteries and fuel cells. Batteries may include solid-state batteries, semi-solid batteries, wet cell batteries, dry cell batteries, flow batteries, primary batteries, secondary batteries, etc. A battery may refer to an assembly of a plurality of individual electrochemical cells, such as arranged in a series configuration. Example electrochemical cells include an anode, a cathode, a separator between the anode and the cathode, and an electrolyte. Electrochemical cells may further include a current collector in electrical contact with an electrode and/or an electrolyte and may be used, in part, to provide a conductive path between the electrode and a load or charging voltage.

"Anode" refers to an electrode in an electrochemical cell where oxidation occurs during discharge of the electrochemical cell. In some embodiments, an anode is identified in an electrochemical cell as the negative electrode, where electrons are emitted during discharge for use by a load. In some embodiments, an anode oxidizes material and releases positive ions to an electrolyte during discharge.

"Cathode" refers to an electrode in an electrochemical cell where reduction occurs during discharge of the electrochemical cell. In some embodiments, a cathode is identified in an electrochemical cell as the positive electrode, where electrons are received during discharge after use by a load. In some embodiments, a cathode reduces positive ions received from an electrolyte during discharge. In some embodiments, the phrases "cathode material" and "composite cathode material" may refer to the overall group of substances that make up the cathode of an electrochemical cell, such as cathode active material as well as other material, which may be inactive. For example coating materials, conductive additives, binders, etc., may also be included in a composite cathode material.

"Active material" refers to a component of an electrode that takes part in an electrochemical reaction during charging or discharging of an electrochemical cell including the electrode. For example, an electrode may include an active material, a binder, and a conductive additive and the active material may correspond to the component of the electrode that actually undergoes oxidation or reduction in an electrochemical reaction during charging or discharging. Example anode active materials include elemental materials, such as lithium; alloys including Si and Sn, or other lithium compounds; and intercalation host materials, such as graphite. Other examples are contemplated and described herein. Example cathode active materials include, but are not limited to those comprising lithium, lithiated compounds, non-lithiated compounds, $LiMn_2O_4$, $LiCoO_2$, $LiCoPO_4$, $LiNi_{0.8}Co_{0.15}Al_{0.05}O_2$, $LiNi_{0.33}Mn_{0.34}Co_{0.33}O_2$, $Li1.2Ni_{0.54}Mn_{0.13}Co_{0.13}O_2$, layered-layered $Li_2MnO_3$-$LiMO_2$ where M is one or more of Mn, Co, and Ni, LiNMC with suitable ratios of Mn, Ni, and Co, such as Ni-rich compounds with 80% Ni, 0% Co and 10% Mn, lithiated metal oxides with gradient compositions, and any combination of these.

"Separator" refers to an ion conductive barrier used to separate an anode and a cathode in an electrochemical cell. In some embodiments, a separator is a porous or semi-permeable membrane that restricts the passage of certain materials across the membrane, while allowing other materials, such as ions, to pass through the membrane. In some embodiments, a separator provides a physical spacing between the anode and the cathode in an electrochemical cell. In some embodiments, a separator is not electrically conductive and provides a gap in electrical conductivity between the anode and the cathode in an electrochemical cell.

"Electrolyte" refers to an ionically conductive substance or composition and may include solvents, ionic liquids, metal salts, ions such as metal ions or inorganic ions, polymers, ceramics, and other components. An electrolyte may be a solid, in some embodiments. An electrolyte may be a liquid, such as a solvent containing dissolved ionic species. An electrolyte may be used, in some embodiments, for transporting ions between an anode and a cathode in an electrochemical cell. Useful electrolytes include, but are not limited to cyclic carbonates, such as propylene carbonate and ethylene carbonate, linear carbonates, such as dimethyl carbonate, diethyl carbonate, and ethyl methyl carbonate, fluorinated carbonates, such as fluoroethylene carbonate, co-solvents, esters, such as methyl acetate, ethyl acetate, methyl propionate, and methyl butyrate, fluorinated esters. Example salts that may be included in electrolytes useful with some embodiments include lithium salts, such as $LiPF_6$, lithium triflate, LiTFSI (lithium bis(trifluoromethane)sulfonamide), and LiFSI (lithium bis(fluorosulfonyl) imide). In some embodiments, an electrolyte may include an electrolyte protectant, such as vinylene carbonate, vinyl ethylene carbonate, LiBOB (lithium bis(oxalate)borate), or fluoroethylene carbonate, which may reduce a rate at which an electrolyte undergoes oxidative degradation, for example.

"Borate" refers to anionic compounds of boron and oxygen. In some embodiments, the term borate refers to an anionic component of a salt or ionic compound. Example borates include $BO_3^{3-}$ as an anionic component. Other borates may be used with some embodiments described herein, including diborate ($B_2O_5^{4-}$), triborate ($B_3O_7^{5-}$), and tetraborate ($B_4O_9^{6-}$). Compounds including borates may be formed by a precipitation reaction between a cation and a borate anion, such as by adding a solution including the anion to a solution of boric acid.

"Particle" refers to a small object having a cross sectional dimension of less than or about 1 mm. For example, in some embodiments, particles may have cross sectional dimensions less than 100 µm, less than 50 µm, less than 10 µm, less than 5 µm, less than 1 µm, less than 500 nm, less than 100 nm, or less than. In some embodiments, particles may have cross sectional dimensions selected from the range of 50 nm to 500 nm. Particles may comprise a single material or may be a composite of different materials or compounds and may adopt any suitable shape. In some embodiments, particles may have spherical or substantially spherical shapes. Particles may be formed of materials soluble or insoluble in a solvent. In some embodiments, particles form a suspension when provided in a solvent or solution. In some embodiments, particles may comprise crystalline material or amorphous (non-crystalline) materials. In some embodiments, crystalline particles may be single-crystal or may be polycrystalline. In some embodiments, a particle may have a coating provided over all or a portions of the surface of the particle.

Particles may join, attach, or otherwise form groups of a plurality of particles which are referred to herein as "aggregates" or "agglomerates." In some embodiments, aggregates or agglomerates may form or be identified as larger structures that have cross sectional dimensions greater than the individual particles that make up the aggregates or agglomerates. For example, in some embodiments, an aggregate or agglomerate of a plurality of particles may have a cross sectional dimension greater than 100 nm, greater than 500 nm, greater than 1 µm, or greater than 10 µm. In some embodiments, an aggregate or agglomerate has a cross sectional dimension selected from the range of 1 µm to 20 µm.

"Binder" refers to a composition that is used to join or hold other materials together in a composite material. Example binder materials include poly(vinylidene difluoride) (PVDF), styrene butadiene rubber (SBR), polyurethane, polymers, conductive polymers, non-conductive polymers, and the like. In some embodiments, binders may be inert or chemically or electrochemically non-reactive with an electrode active material. In some embodiments, a binder may be used to join particles or units of electrode active material to form a larger composite electrode.

"Conductive additive" refers to an electrically conductive material that may be added to a composite or mixture of other materials to increase or enhance the electrical conductivity of the composite or mixture or to provide conductive pathways between other elements of the composite or mixture. Example conductive additives include carbon-based materials, such as carbon black, graphite, carbon nanotubes, and the like. In some embodiments, conductive additives are included in a composite electrode to provide or enhance the electrical conductivity between particles or units of an electrode active material. In some embodiments, conductive additives may be inert or chemically or electrochemically non-reactive with an electrode active material.

"Porous" refers to a property of an object that includes one or more voids or empty spaces in a material that may extend partially or completely through the material such that other materials may optionally fill the voids. In some embodiments, particles may be individually porous. In some embodiments, agglomerates or aggregates of a plurality of particles may be porous or exhibit a porosity such that another material may be provided inside pores, voids, or inter-agglomerate or inter-aggregate spaces of the agglomerates or aggregates.

"Coating" may refer to a process of depositing or otherwise providing a layer (or partial layer) of one material over an underlying material. A "coating" or "coating material" may also refer to the layer (or partial layer) of material that is provided over the underlying material. In some embodiments, a coating may provide a protective barrier to the underlying material, which may allow, for example, a degree of protection of the underlying material from reacting with other substances above the coating. In some embodiments, coatings may be formed by precipitating material onto a surface of an object in solution, such as a cathode, cathode active material, or suspended particles of a cathode active material. For example, coatings on suspended particles of a cathode active material may be formed by a cation-anion precipitation reaction in the suspension. In some embodiments, coatings may be formed by depositing material onto a surface of an object, such as by atomic layer deposition or chemical vapor deposition processes.

"Uniform distribution" refers to a relative orientation of materials such that one material is provided adjacent to another material in a homogeneous or substantially homogenous fashion. For example, in some embodiments, a first material may be uniformly distributed over second material such that a concentration or thickness of the first material in one location or area is the same as or substantially the same as a concentration or thickness of the first material in a second and other locations or areas. In some embodiments, uniform distribution refers to a constant or substantially constant thickness dimension of a coating material, such as a thickness dimension that has a root mean square deviation from an average thickness of less than 0.2 times the average thickness, 0.15 times the average thickness, 0.1 times the average thickness, 0.05 times the average thickness, or 0.01 times the average thickness.

"Conformal" refers to a relative orientation of materials such that a first material is provided adjacent to a second material and follows the topology and curvature of the surface of the second material such that a thickness of the first material does not substantially deviate from an average thickness at recessed or raised regions of the second material. In some embodiments, a conformal first material fills in recessed regions of the second material. In some embodiments, a conformal first material covers raised regions of the second material. In some embodiments, a conformal coating may have a constant or substantially constant thickness dimension over an underlying material, such as a thickness dimension that has a root mean square deviation from an average thickness of less than 0.2 times the average thickness, 0.15 times the average thickness, 0.1 times the average thickness, 0.05 times the average thickness, or 0.01 times the average thickness.

A "protective barrier" may refer to the property of a material, such as a coating, that isolates, prevents, or otherwise reduces the rate at which an undesired reaction or undesired contact takes place with a material underlying the coating. For example, in some embodiments, a coating may serve as a protective barrier for an underlying material by preventing the underlying material from making direct contact with materials or substances above the coating, such as a liquid or solution. For example, in some embodiments, a coating reduces a rate at which a chemical or electrochemical reaction occurs between an underlying material and materials or substances above the coating and/or may prevent the chemical or electrochemical reaction from occurring at all. In some specific embodiments, a metal borate coating over a cathode active material provides a protective barrier against oxidative degradation of an electrolyte that contacts the coating and/or the cathode active material, such as when the cathode active material is charged using a voltage greater than 4.2 V.

"Precipitation reaction" refers to a chemical process in which two or more substances combine or otherwise react in solution to form a precipitate, which may be an insoluble or substantially insoluble material in the solvent. In some embodiments, a precipitate may fall or settle to the bottom of a solution, such as by the force of gravity. In some embodiments, a precipitate may remain suspended in a liquid for a time period and may not immediately settle. In some embodiments, a precipitation reaction may form a surface coating or layer of precipitate on another object, such as a suspended particle. In some embodiments, a precipitation reaction occurs between a cation precursor and an anion precursor to form a precipitate that is a salt or ionic compound. In some embodiments, the cationic component of a precipitate may originate from the cation precursor and the anionic component of a precipitate may originate from the anion precursor. In one specific example useful for some embodiments, an anion precursor may comprise borate ions, such as a solution of boric acid. In one specific example useful for some embodiments, a cation precursor may comprise metal ions, such as a metal nitrate solution. In some embodiments, combination of a solution of metal nitrate with a solution of boric acid may form a metal borate as a precipitate via a precipitation reaction.

A "suspension" refers to a heterogeneous mixture of a liquid, such as a solvent or a solution, and solid particles that are floating or otherwise held in the solution without dissolving.

"Sintering" refers to a process in which a solid is exposed to heat and/or pressure, such as to join or densify particles of the solid, to crystallize particles of the solid, or to alloy elements of the solid without melting the solid. Example sintering conditions include exposing the solid to a temperature of about 400° C. or less.

"Annealing" refers to a process in which a solid is exposed to heat in order to reduce or eliminate crystal defects in the solid without melting the solid. Example annealing conditions include exposing the solid to a temperature of about 400° C. or less.

"Tap density" refers to a measure of the amount of mass of powdered material that occupies a particular volume after a compaction process. Example compaction processes include vibrating or tapping a container including the powdered material to allow the powdered material to settle/compact. It will be appreciated that commercial hardware may be used to measure a tap density of a powdered material.

"Discharge capacity" refers to an amount of charge per mass of an electrochemical cell that can be drawn from the electrochemical cell, and may have units of mAh/g. In some embodiments, a discharge capacity is measured between two specific voltage values or state-of-charge (SOC) values for the electrochemical cell. In some embodiments, a discharge capacity is measured between a maximum voltage of the electrochemical cell or 100% state-of-charge and a lower voltage, such as 2.0 V, or a lower state-of-charge, such as 20% state-of-charge.

"Slurry" refers to a fluid mixture of a solvent and solid materials, such as particles, aggregates or agglomerates. A slurry may include a majority fraction of solid materials and may include an amount of a solvent sufficient to allow the slurry to flow as a liquid.

III. Composite Cathode Materials

Composite cathode materials and methods of making composite cathode materials are provided herein. In some embodiments, a composite cathode material comprises a cathode active material and a metal borate compound coating the cathode active material.

Optionally, the composite cathode material and/or the cathode active material is porous. Porous materials may be useful with some embodiments as these materials may provide an enhanced surface area as compared to nonporous materials, which may enhance a rate at which oxidation/reduction of the cathode active material may occur during charging/discharging, as more surface area may correspond to more available sites for uptake or release of ions to an electrolyte in an electrochemical reaction. In some embodiments, a composite cathode material may be porous due to the inherent porosity of the cathode active material beneath which a metal borate coating is formed.

A. Cathode Active Material

A variety of cathode active materials are useful with the composite cathode materials and electrochemical cells described herein. For example, the cathode active material may comprise a lithium ion composite cathode material. Although lithium ion based electrochemical cells are the focus of the examples described below, it will be appreciated that other battery chemistries may obtain advantages by use of a metal borate coating on a cathode active materials. For example, lithiated compounds and non-lithiated compounds may be useful for the cathode active materials in some embodiments.

Specific examples of cathode active materials include, but are not limited to, $LiMn_2O_4$, $LiCoO_2$, $LiCoPO_4$, $LiNi_{0.8}Co_{0.15}Al_{0.05}O_2$, $LiNi_{0.33}Mn_{0.34}Co_{0.33}O_2$, $Li1.2Ni_{0.54}Mn_{0.13}Co_{0.13}O_2$, layered-layered $Li_2MnO_3$-$LiMO_2$ where M is one or more of Mn, Co, and Ni, LiNMC with suitable ratios of Mn, Ni, and Co, such as Ni-rich compounds with 80% Ni, 0% Co and 10% Mn, and lithiated metal oxides with gradient compositions. In some embodiments, the cathode active material comprises lithium and one or more of nickel, magnesium, aluminum, and cobalt.

Figure 2A:
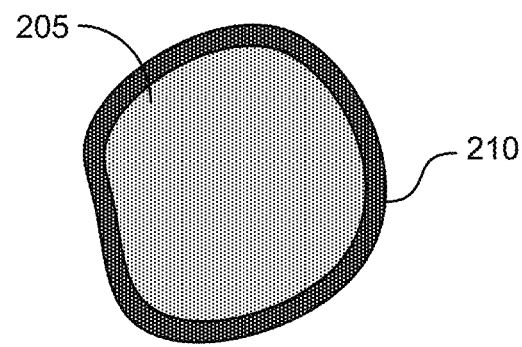
FIG. 2A, FIG. 2B, and FIG. 2C provide schematic illustrations of cathode active materials with a metal borate coatings.

Optionally, the cathode active material comprises particles, such as crystalline particles. FIG. 2A provides a schematic illustration of a particle of a cathode active material 205 with a metal borate coating 210 thereon. Particles of cathode active materials may include those having cross-sectional dimensions of 500 nm or less, for example selected from the range of 50 nm to 500 nm. In some embodiments, the cathode active material comprises crystalline particles having cross-sectional dimensions selected from the range of 50 nm to 500 nm.

Figure 2B:
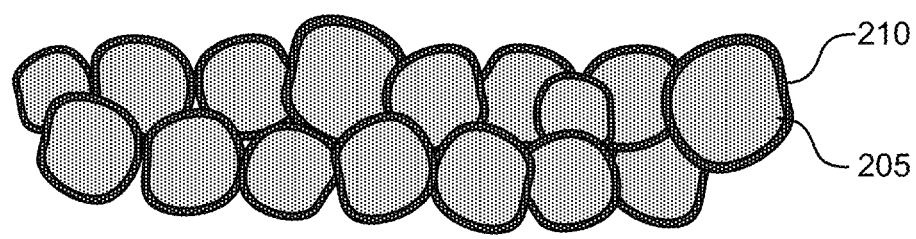

Particles of the cathode active material may form agglomerates of a plurality of particles, such as an agglomerate of crystalline particles. FIG. 2B provides a schematic illustration of an agglomerate of a plurality of particles, with each particle comprising cathode active material 205 and a metal borate coating 210. Optionally, the agglomerates have cross sectional dimensions of 20 µm or less, for example selected from the range of 1 µm to 20 µm. In some embodiments, the cathode active material comprises agglomerates of crystalline particles and the agglomerates have cross sectional dimensions selected from the range of 1 µm to 20 µm.

The particles of the cathode active material may optionally take on any suitable shape, though spherical or substantially spherical shaped particles may be useful as methods of preparing cathode active material particles may primarily form spherical or substantially spherical particles, in some embodiments. Agglomerates of particles may also optionally take on any suitable shape, though the agglomeration of particles may result in many hundreds or thousands or more particles aggregating together to form a single larger agglomerate, and this process may dictate the resultant shape of the agglomerate, in some embodiments. It will be appreciated that the metal borate coating may optionally be applied to the individual particles or to the agglomerates.

Figure 2C:
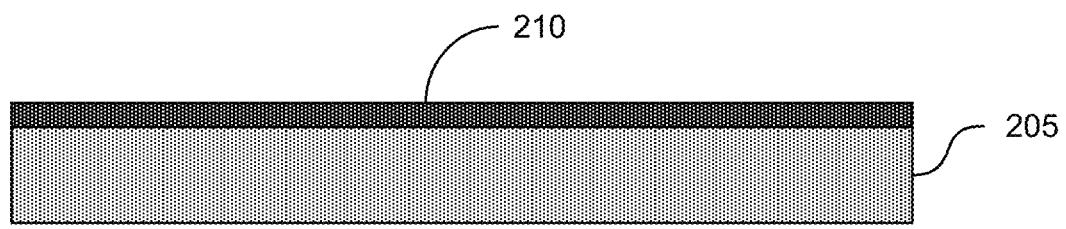

In some embodiments, the cathode may comprise a layer of a cathode active material and a surface coating of a metal borate compound thereon. FIG. 2C provides a schematic illustration of a layer of cathode active material 205 with a metal borate coating 210. It will be appreciated that FIG. 2C may also represent an electrode formed of a plurality of particles or aggregates or agglomerates of cathode active material in which the individual particles of the cathode active material are coated with the metal borate compound.

B. Metal Borate Coating

The metal borate compounds coating the cathode active material provide a number of specific advantages to the composite cathode materials disclosed herein. For example, in some embodiments, the metal borate compound provides a protective barrier against oxidative degradation of an electrolyte in contact with the composite cathode material, such as when the cathode active material is charged using a voltage greater than 4.2 V. In some embodiments, the metal borate may reduce a rate at which an electrolyte is decomposed and/or a rate at which a surface layer or solid electrolyte interface (SEI) is formed. In this way, the metal borate coating can extend the cycle life of an electrochemical cell to cycles well in excess of the cycle life of a comparable electrochemical cell that does not include a metal borate coating. For example, electrochemical cells including a metal borate coated cathode have been observed to exhibit more than 4 times the usable cycle life as compared to an uncoated cathode, and more than 2 times the usable cycle life as compared to a metal phosphate coated cathode.

In addition, the metal borate coated cathode may also provide an electrochemical cell with a capacity enhancement over comparable electrochemical cells that do not include a metal borate coating. For example, increases in capacity of 10% or more over metal phosphate coated composite cathode materials have been observed in electrochemical cells including a metal borate coated cathode.

A variety of metal borate coatings are useful with the composite cathode materials described herein. For example, in some embodiments, the metal borate compound comprises $AlBO_3$. Other metal borate compounds are contemplated herein, including $FeBO_3$, alkali metal borates, alkaline earth borates, and transition metal borates. Optionally, the metal borate compound has a thickness selected from the range of 0.5 nm to 20 nm.

In some embodiments, the metal borate compound is uniformly distributed over a cathode active material. In some embodiments, the metal borate compound is conformal to the cathode active material. Use of uniformly distributed or conformal metal borate coatings may be useful for protecting an electrolyte from oxidative degradation, for example. In some embodiments, the process by which the metal borate coating is formed may dictate whether the metal borate coating is of uniform thickness or is conformal to the underlying cathode active material.

A variety of techniques are disclosed for forming a metal borate coating. In some embodiments, atomic layer deposition or chemical vapor deposition techniques may be used to form a metal borate coating over a cathode active material. In some embodiments, creation of a metal borate compound by a precipitation reaction may be used to form a metal borate coating over a cathode active material.

In some embodiments, the metal borate compound is formed by a precipitation reaction between metal cations and borate anions. For example, the metal borate compound is optionally formed by a precipitation reaction between aluminum anions in a solution and borate anions in a solution.

In some embodiments, the metal borate coating may comprise a fraction of the total mass of the composite cathode material. For example, in some embodiments, the coating comprises a percentage of the composite cathode material, by weight, of between 1% and 3%. Thus it will be appreciated that, in some embodiments, the majority of the composite cathode material comprises the cathode active material while the metal borate coating provides only a thin surface layer.

IV. Methods of Making Composite Cathode Material

Methods of making composite cathode materials are also provided. In some embodiments, a composite cathode material is formed by creating a reaction mixture by adding a cathode active material, a cation precursor, and an anion precursor to a solvent to initiate a precipitation reaction between the cation precursor and the anion precursor to form the cathode active material. As described above, the composite cathode material may comprise the cathode active material and a metal borate coating on the cathode active material. Optionally, the cation precursor comprises a metal salt or metal ions in a solution. Optionally, the anion precursor comprises borate anions, a borate salt, or a boric acid solution.

In some embodiments, a method of making a composite cathode material comprises forming a reaction mixture by adding a cathode active material, a cation precursor, and an anion precursor to a solvent. Upon addition of these materials, a precipitation reaction may occur between the cation precursor and the anion precursor to form the composite cathode material, such as a composite cathode material that comprises the cathode active material and a metal borate coating on the cathode active material. In some embodiments, forming the reaction mixture comprises adding the cathode active material to the solvent to form suspended cathode active material in the solvent; adding the cation precursor to the solvent, thereby forming a solution containing metal cations and suspended cathode active material; and adding the anion precursor to the solution. In some embodiments, adding the anion precursor to the solution comprises adding the anion precursor to the solution drop-wise while continually stirring the solution.

It will be appreciated that the reaction mixture may be formed by adding the cathode active material, the cation precursor, and the anion precursor to the solution in any order. FIG. 1 provides a schematic overview of a method of making a composite cathode material in accordance with some embodiments. In some embodiments, the cathode active material 105 is added to the solvent 110 first, such that a suspension 115 of the cathode active material in the solvent may be formed. In some embodiments, the cation precursor 120 is then added to the suspension 115. For example, in some embodiments, the cation precursor may comprise a metal salt, such as a metal nitrate or a metal nitrate-hydrate (e.g., aluminum nitrate nonahydrate), and an amount of the cation precursor may be dissolved in the suspension to form a solution including dissolved metal ions with suspended cathode active material. Alternatively, a solution of the cation precursor may be added to the suspension. Alternatively, the cathode active material may be added to a solution of the cation precursor.

Next, in some embodiments, the anion precursor 125 may be added to the reaction mixture 130. Useful anion precursors include borate salts, boric acid solutions, and other solutions including borate anions. The anion precursor may be added to the reaction mixture drop-wise 135 with continuous mixing or stirring 140 in order to control the rate at which the precipitation reaction occurs, in some embodiments. After all of the anion precursor is added to the reaction mixture, mixing may optionally be continued for a period of time. This may result in a more uniform metal borate precipitate coating on the suspended cathode active material.

Alternatively, in some embodiments, the anion precursor is added to the reaction mixture before the cation precursor is added. For example, in some embodiments, the anion precursor may comprise a boric acid solution, and an amount of the anion precursor may be added to the suspension to form a solution including dissolved borate ions with suspended cathode active material. Alternatively, the cathode active material may be added to a solution of the anion precursor.

Next, in some embodiments, the cation precursor may be added to the reaction mixture. The cation precursor may be added to the reaction mixture drop-wise with continuous mixing or stirring in order to control the rate at which the precipitation reaction occurs, in some embodiments. After all of the cation precursor is added to the reaction mixture, mixing may optionally be continued for a period of time. This may result in a more uniform metal borate precipitate coating on the suspended cathode active material.

In some embodiments, once the composite cathode material is formed, the solvent may be evaporated, such that the composite cathode material is allowed to dry. Optionally, the composite cathode material may be filtered or centrifuged in order to remove the composite cathode active material from the solvent. The dried composite cathode material may be optionally crushed to form a powder. The dried composite cathode material may optionally be sintered or annealed, such as by exposing the dried composite cathode material to a temperature of about 400° C. or less. Sintering and/or annealing the composite cathode material, in some embodiments, may provide for compaction or densification of the composite cathode material or for repair of crystal defects in the cathode active material, for example.

In some embodiments, the method further comprises forming the composite cathode material into an electrode. Optionally, forming the composite cathode material into an electrode comprises applying a slurry comprising the composite cathode material to a current collector; and drying the slurry, thereby forming the electrode. In some embodiments the electrode is used to make an electrochemical cell. For example, in some embodiments, the method further comprises assembling an electrochemical cell using the electrode, such as an electrochemical cell that comprises a cathode comprising the electrode; an anode; a separator positioned between the anode and the cathode; and an electrolyte positioned between the anode and the cathode and in contact with the separator. Optionally, the method may further comprise charging the electrochemical cell by applying a charging voltage between the cathode and the anode, wherein the charging voltage is greater than 4.2 V. Further details regarding electrochemical cells comprising the composite cathode materials are described below.

V. Electrochemical Cells

Electrochemical cells and methods of making electrochemical cells are also provided. In some embodiments, an electrochemical cell comprises an anode, a cathode, a separator positioned between the anode and the cathode, and an electrolyte positioned between the anode and the cathode and in contact with the separator. In embodiments, the cathode comprises a composite cathode material described herein, such as a composite cathode material comprising cathode active material and a metal borate coating over the cathode active material. Optionally, a voltage difference between the anode and the cathode is greater than 4.2 V. In some embodiments, the voltage difference may correspond to voltage difference obtained after charging the electrochemical cell, such as using a voltage greater than 4.2 V. In embodiments, the metal borate compound provides a protective barrier against reaction of the electrolyte when the cathode active material is charged using a charging voltage greater than 4.2 V.

Figure 3:
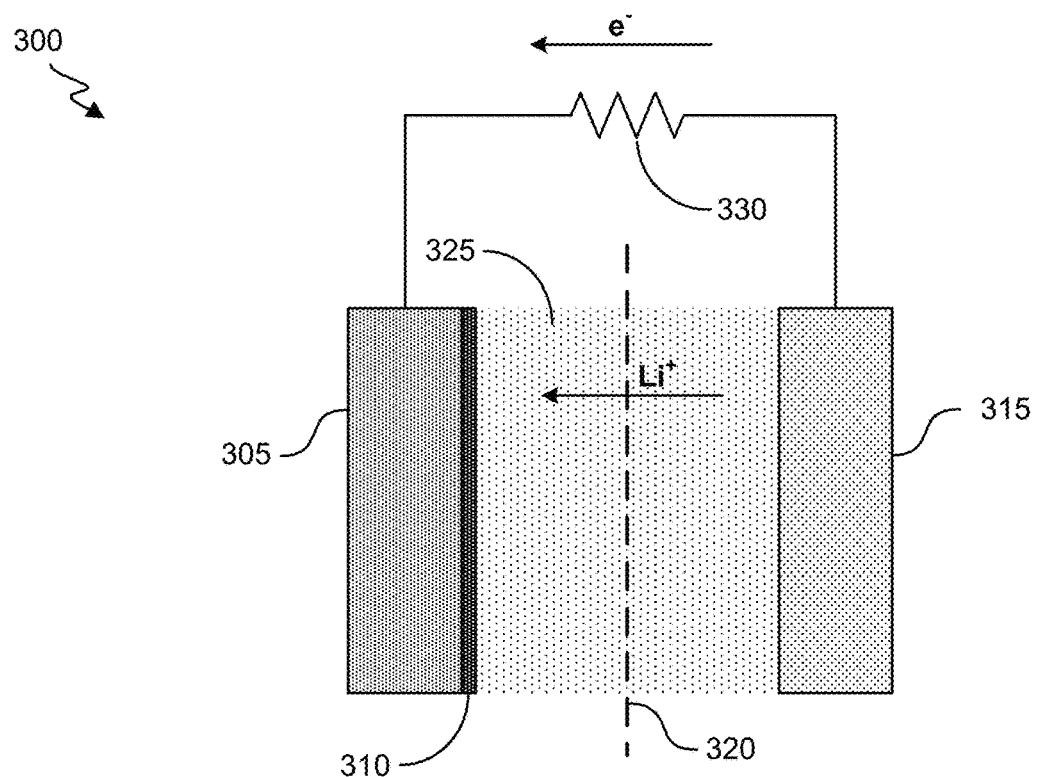
FIG. 3 provides a schematic illustration of an electrochemical cell including a composite cathode comprising a cathode active material with a metal borate coating under discharge conditions, in accordance with some embodiments.
Figure 4:
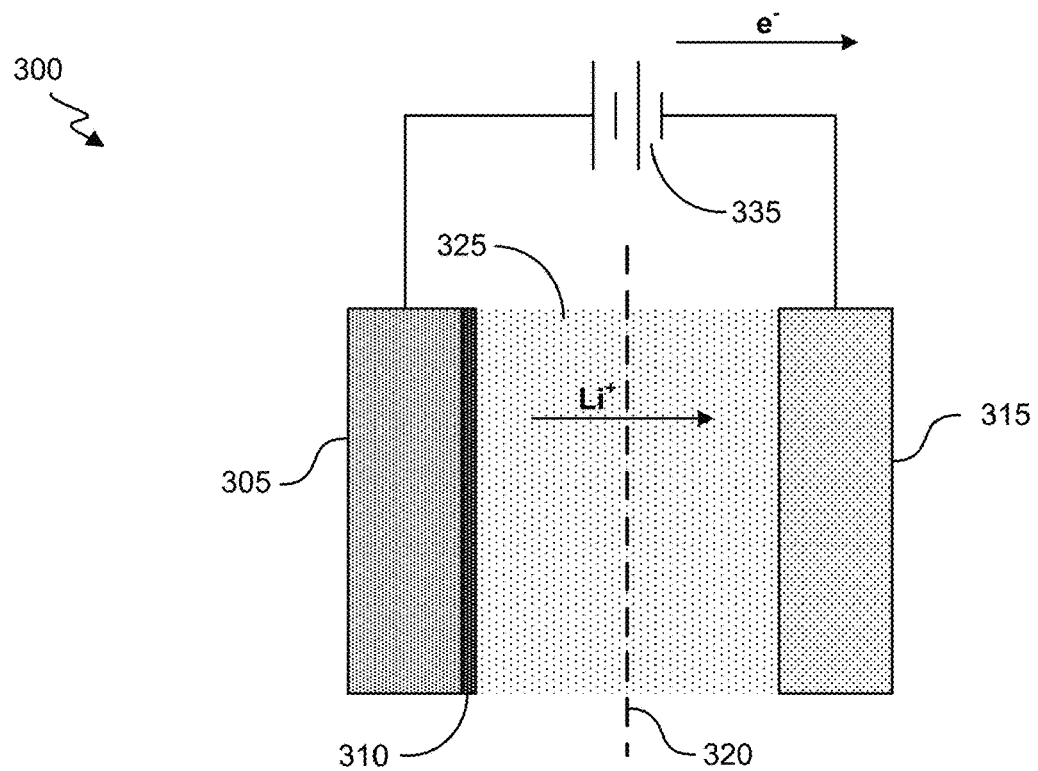
FIG. 4 provides a schematic illustration an electrochemical cell including a composite cathode comprising a cathode active material with a metal borate coating under charging conditions, in accordance with some embodiments.

FIG. 3 and FIG. 4 provide schematic illustrations of an electrochemical cell 300. Electrochemical cell 300 includes cathode active material 305, metal borate coating 310, anode 315, separator 320, and electrolyte 325. It will be appreciated that, while metal borate coating 310 is depicted as a layer or film over a layer of the cathode active material 305, this illustration is intended to also represent a configuration where the cathode active material 305 is in particle form (such as an aggregate or agglomerate of a plurality of particles) and the metal borate coating 310 is a coating layer on the surface of the particles of cathode active material, such as depicted in FIGS. 2A and 2B. For example, the cathode is optionally provided in the form of an electrode comprising an aggregate of a plurality of particles of the cathode active material each coated with the metal borate compound. FIG. 3 depicts the electrochemical cell 300 undergoing a discharging process in which current flows from the anode 315 to the cathode active material 305 through load 330. During the discharging process, lithium ions are released by anode 320 to electrolyte 325, passed through the separator 320, and taken up by the cathode active material 305. FIG. 4 depicts the electrochemical cell 300 undergoing a charging process in which current flows from the cathode active material 305 to the anode 315 and is driven by a voltage source 335. During the charging process, lithium ions are released by the cathode active material 305 to the electrolyte 325, passed through the separator 320, and taken up by the anode 315.

It will be appreciated that a variety of anode materials are useful with the electrochemical cells disclosed herein, including any anode material suitable for the particular chemistry of the electrochemical cell. In a lithium-based electrochemical cell, useful anode materials include, but are not limited to, metallic lithium, and lithium intercalation type anodes, such as graphite- or silicon/carbon based anodes.

In some embodiments, methods of making an electrochemical cell are provided. In some embodiments, a method of making an electrochemical cell comprises making a composite cathode material, such as using a precipitation reaction as described above. For example, the cathode may material may be prepared and formed into an electrode, such as an electrode comprising an aggregate of a plurality of particles of cathode active material each coated with a metal borate compound. Optionally, the electrode may comprise a binder, such as poly(vinylidene difluoride). Inclusion of a binder may aid, in some embodiments, in the formation and or cohesion of the electrode such that it can be manipulated. Optionally the electrode may comprise a conductive additive, such as carbon black, carbon nanotubes, or graphite. Inclusion of a conductive additive may, in some embodiments, enhance the usability of the cathode active material by providing additional conductive pathways between elements of the cathode active material such that more of the cathode active material is in electrical communication than if the conductive additive were not present.

In some embodiments, forming the composite cathode material into an electrode comprises generating a slurry of the composite cathode material, such as by adding a solvent to a powder of the composite cathode material, applying the slurry to a current collector, and drying the slurry, thereby forming the electrode. It will be appreciated that additional components, such as binders and conductive additives may be added to the cathode active material prior to forming the composite cathode material into an electrode.

An electrochemical cell may be assembled using the formed electrode comprising the composite cathode material. For example, the electrochemical cell may be assembled by positioning the cathode adjacent to an anode with a separator in between the cathode and the anode and adding an amount of electrolyte between the cathode and the anode in order to provide an ion conductive pathway between the anode and the cathode through the separator. It will be appreciated that other components of an electrochemical cell may be included, such as one or more current collectors. In some embodiments, making an electrochemical cell may comprise charging the electrochemical cell by application of a charging voltage between the cathode and the anode, such as a voltage greater than 4.2 V. Inclusion of the metal borate coating on the cathode active material may provide a protective barrier against reaction of the electrolyte, such as an oxidative degradation reaction, when the charging voltage is greater than 4.2 V. In some embodiments, oxidative degradation of the electrolyte when the charging voltage is greater than 4.2 V may not be completely eliminated, but the presence of the metal borate coating may reduce the rate of degradation of the electrolyte to below a rate that would occur of the metal borate coating were not present on the cathode active material.

VI. Examples

The invention may be further understood by reference to the following non-limiting example.

Example 1

Aluminum Borate Coating on High-Voltage Cathodes for Li-Ion Batteries

Li-rich layered-layered nickel manganese cobalt oxides (LLNMC) of the type $Li_2MnO_3$-$LiMO_2$ (M=Mn, Co, Ni) are promising cathode materials due to their higher specific capacities and discharge voltages compared to state of art materials. However, these materials have yet to exhibit adequate cycle life and power characteristics in practical cells, partly due to the instability of electrolytes at these high voltages. Thin coatings of inorganic materials such as $Al_2O_3$, $AlPO_4$, and $AlF_3$ have been shown to minimize these degradation processes, especially on high voltage cathodes. This example describes the use of a new aluminum borate-based coating material on the LLNMC cathode at high active mass loadings. $AlBO_3$-coated cathodes demonstrate a sevenfold increase in lifetime compared to uncoated material, as well as higher specific discharge energies vs. analogous $AlPO_4$-coated materials. SEM and TEM confirm the thin coatings of amorphous material. Detailed electrochemical studies including Tafel polarization, PITT, and Electrochemical Impedance Spectroscopy (EIS) show that the $AlBO_3$ coating improves the kinetics of electron transfer.

Improving energy storage and transport capabilities may be useful as society becomes more and more based on renewable energy sources. A problem in the development of next generation lithium-ion batteries is to develop improved cathode materials with increased energy storage capacities. Li-rich layered-layered cathode materials of the form $Li_2MnO_3$—$LiMO_2$=Mn, Co, Ni) have attracted considerable interest over the last decade due to their higher specific capacities (240-280 mAh/g) compared to the state of art cathode materials such as $LiMn_2O_4$ (LMO: 120 mAh/g), $LiCoO_2$ (LCO: 140 mAh/g), $LiFePO_4$ (LFP: 160 mAh/g), $LiNi_{0.8}Co_{0.15}Al_{0.05}O_2$ (NCA: ~170 mAh/g), and $LiNi_{0.33}Mn_{0.34}Co_{0.33}O_2$ (NMC: 150-190 mAh/g). However, these high capacity materials have yet to be adopted in commercial cells due to multiple technical barriers, including voltage and power fade during cycling, poor power characteristics, and modest cycle life at the high charging voltage (>4.5 V) necessary to achieve these capacities. One feature of these layered-layered NMC (LLNMC) cathode materials is that they release oxygen during the first charge step at 4.5 V, concomitant with oxidation of the $Li_2MnO_3$ component. Although this process enables the material to yield its high specific capacity, the resulting structural instability and degradation, oxygen-induced reactions, and loss of lithium to oxidation products cause an irreversible capacity loss of 50-100 mAh/g during the formation cycle. Additionally, although the high voltage needed to fully cycle this cathode increases the energy yield, it appears to be a contributing factor to the decrease in overall cell cycle life, possibly caused by the buildup of electrolyte-derived surface films.

One successful strategy for stabilizing high-voltage LLNMC cathodes against electrolyte decomposition processes involves coating the active material with a thin layer of inorganic material, such as $Al_2O_3$, $AlPO_4$, $AlF_3$, or $FePO_4$. While some of these coatings marginally increase the initial interfacial impedance, they have been shown to minimize impedance growth during cycling by inhibiting the cathode-electrolyte reactions that plague the pristine material. This example explores the effects of replacing coating the active material with a borate layer in the amorphous coating network. In addition to a borate coating, lithium borate additives may increase electrolyte stability in the presence of high voltage cathodes, possibly by producing a protective borate film. This example describes the benefits of an $AlBO_3$ surface coating on the performance and electrochemical behavior of LLNMC cathode materials, especially on cycling stability and cell longevity at high active material loadings. The inventors believe that this coating has not been previously reported. For comparison, analogous preparation and characterization of LLNMC materials with $AlPO_4$- and $AlBO_3$-based coatings are described. The fundamental electrochemical properties of the coated and uncoated materials are determined using DC polarization techniques and Electrochemical Impedance Spectroscopy (EIS), and are compared as a function of cycle life to understand how they change during cycling and influence the cell performance.

Experimental

Materials Synthesis.

The LLNMC cathode powder used in these studies was used as received for the pristine sample. The composition of the material is $Li_{1.2}Ni_{0.54}Mn_{0.13}Co_{0.13}O_2$ and the measured tap density was 1.97 g/cm³. The 2 wt % $AlPO_4$- and $AlBO_3$-coated materials were prepared using a procedure as described below.

For the 2 wt % $AlPO_4$ coating, 20 g of cathode powder was suspended in 150 mL of deionized (DI) $H_2O$, and a stoichiometric amount of aluminum nitrate nonahydrate (1.23 g, 3.2 mmol) was dissolved in the suspension. A solution of the anion precursor was prepared by separately dissolving ammonium phosphate (0.43 g, 3.2 mmol) in 50 mL DI $H_2O$. The phosphate solution was added drop-wise to the cathode solution at a rate of 1 drop/s with rapid stirring, and then allowed to stir at room temperature overnight. The solution was evaporated to dryness at 100° C. The dried powder was crushed and annealed at 400° C. for 4 h, then allowed to cool to room temperature in the furnace. For the 2 wt % $AlBO_3$ coating, 20 g cathode powder was suspended in 150 mL of DI $H_2O$, and a stoichiometric amount of aluminum nitrate nonahydrate (1.75 g, 4.7 mmol) was dissolved in the suspension. A solution of the anion precursor was prepared by separately dissolving boric acid (0.29 g, 4.7 mmol) in 50 mL DI $H_2O$. The same procedure described for the $AlPO_4$ material was used to synthesize the $AlBO_3$ material.

Material Characterization.

Phase characterizations were performed using X-Ray powder diffraction (PANalytical, PW3040-PRO, Cu Kα radiation between 5° and 90° 2Θ, scan rate 0.02° 2Θ/min) at an accelerating voltage of 45 kV and tube current of 20 mA. Surface morphologies were studied using a ZEISS 1550VP Field Emission scanning electron microscope (SEM) equipped with an Oxford EDS detector. Additional morphological studies were conducted with a FEI Tecnai F30ST (300 kV) transmission electron microscope (TEM). Samples were dispersed on Cu/Au grids with iPrOH and allowed to dry. Selected samples were embedded in epoxy, microtomed to yield thin cross-sectional images, and dispersed onto grids as described above. Tap density measurements were performed with a Quantachrome Autotap instrument with 1000 taps per sample. The compositions of the cathode materials were determined using inductive coupled plasma (ICP), which was performed at the UC Davis Interdisciplinary Center for Plasma Mass Spectrometry.

Electrochemical Studies.

One-sided electrodes were prepared by spreading cathode slurries on Al foil substrates using a doctor blade. The slurries consisted of 86 wt % cathode active material, 7 wt % poly(vinylidene difluoride) binder (PVDF, Sigma-Aldrich, $MW_{avg}$=534,000), and 7 wt % carbon black powder (Sigma-Aldrich) in N-methyl-2-pyrrolidinone (NMP, Sigma-Aldrich). The electrode loading (14-16 mg/cm²) is much higher than what is normally reported in the literature and was chosen to match the values used in prototype cells with high specific energies being built industrially with the LLNMC cathode. The inventors have found that cells built with lower loadings exhibit longer lifetimes, but are less applicable to prototype and real-life cell development.

Cycle life and rate capacity studies were carried out in coin half cells, prepared by assembling the cathode, 20 μm Tonen separator, and 2 layers of a Li foil anode in Al clad CR2032 cases with stainless steel hardware and 100 μL of electrolyte (1.0 M $LiPF_6$ and 0.1 M lithium bis(oxalate) borate dissolved in 20:70:10 vol % fluoroethylene carbonate:ethyl methylcarbonate:triphenylphosphate). This electrolyte is compatible with the high voltage LLNMC cathode, and is less flammable for improved safety of Li-ion cells. Electrochemical studies, including DC Tafel polarization for electrode kinetics, Electrochemical Impedance Spectroscopy (EIS) for SEI characteristics, and Potentiostatic Intermittent Titration Technique (PITT) for diffusional kinetics of $Li^+$ within the cathodes were carried out in three-electrode pouch cells. These cells were assembled with a 40 cm² LLNMC cathode, a Li-wrapped Ni mesh anode, a Li reference electrode, and 3 mL of electrolyte. The Li reference electrode was made with a 1×1 cm Ni mesh substrate spot-welded to a Ni tab and wrapped with two layers of Li foil. The electrode was sealed in an envelope made of Tonen separator and placed between the cathode and anode, covering only a small portion of the anode/cathode. In all cases, the cells were initially charged to 4.6 V vs. Li$^+$/Li, undergoing a total of five formation cycles between 2.5 V and 4.6 V. Long term cycling was then carried out in a window of 2.5 to 4.5 V vs. Li$^+$/Li. All cycling was done at a rate of C/10 followed by a constant voltage step at the charge cutoff voltage for one hour, during which the current was observed to fall to 3-5% of the rated capacity. EIS, Tafel, and PITT measurements were made as a function of cycle number at 4.3 V (approximately 80% SOC) using a potentiostat/galvanostat/frequency response analyzer (Bio-logic VMP2). For the EIS measurements, the applied AC signal was 5 mV peak-to-peak over a frequency range of 200 kHz-10 mHz. Tafel polarization measurements were performed by applying a 0.5 mV/s potentiodynamic sweep from 4.3 V to 4.15 V vs. Li$^+$/Li to approximate steady-state conditions, and the resulting curves were corrected for mass transfer interference. PITT measurements were performed by applying 10 mV discharge pulses from 4.3 V to 4.25 V vs. Li$^+$/Li. Impedance spectra and PITT data were fitted using the Bio-Logic EC-Lab software. All charge-discharge cycling and capacity measurements were performed using an Arbin battery cycler.

Results and Discussion. Coating Procedure and Bulk Analyses.

Figure 16:
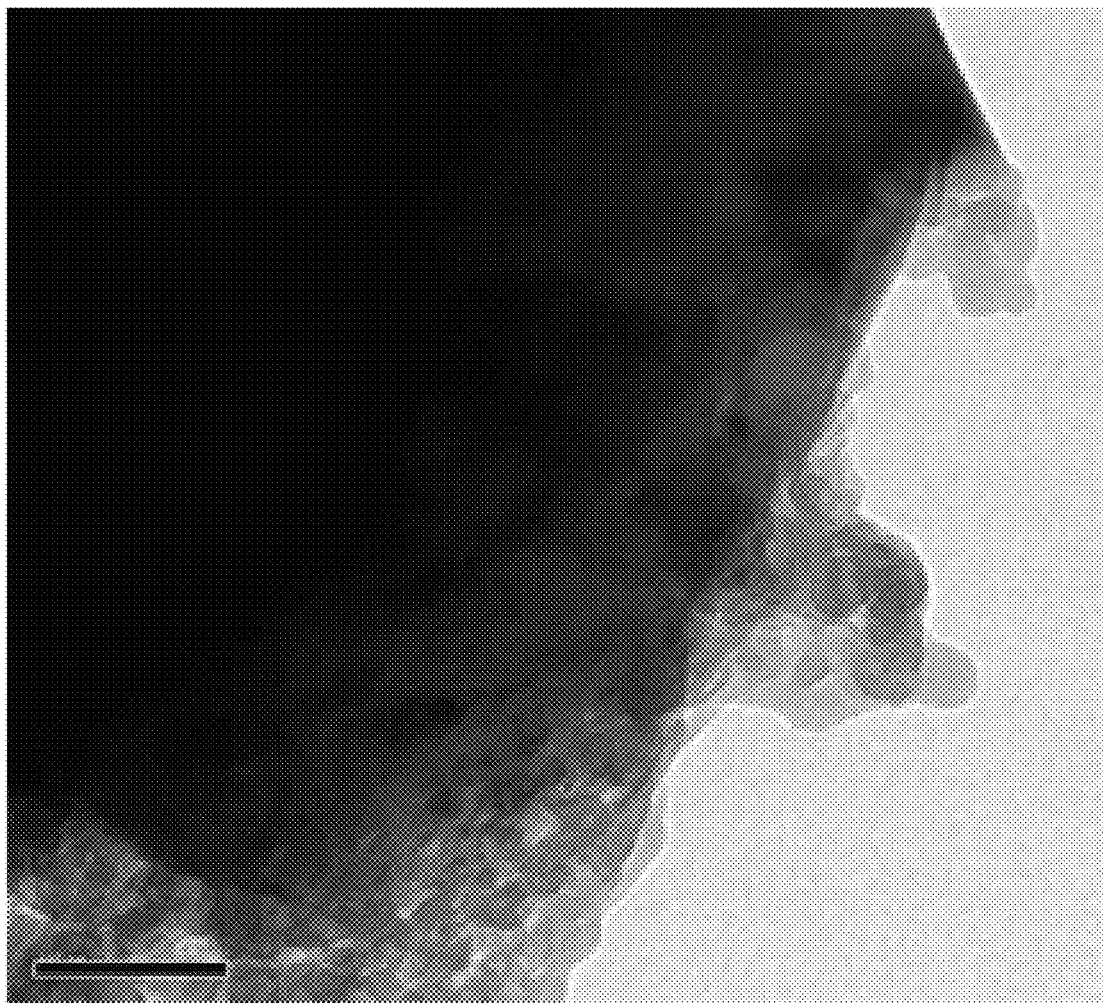
FIG. 16 provides a TEM image of a metal phosphate coated particle of a composite cathode active material.
Figure 17:
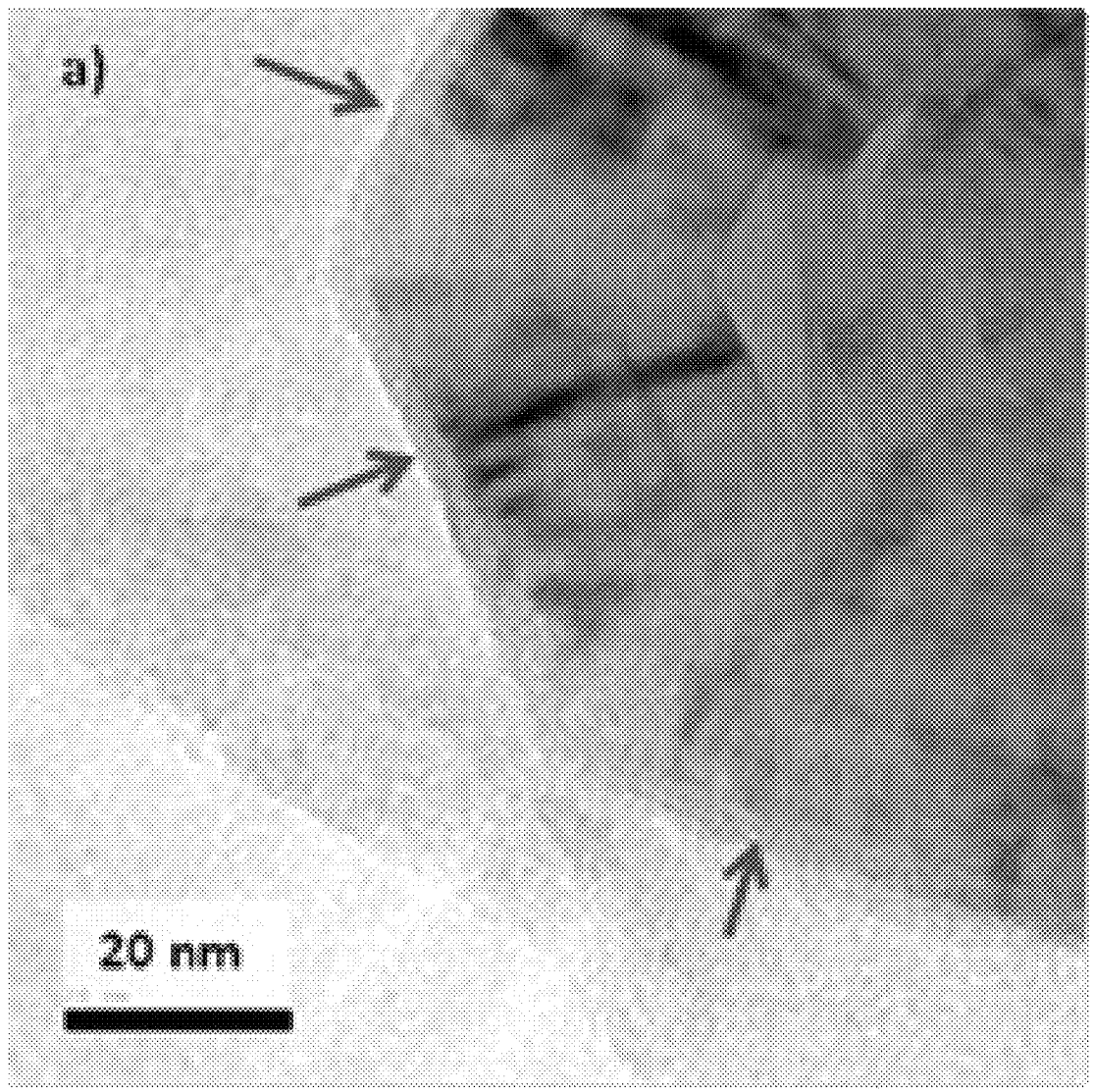
FIG. 17 provides a TEM image of a metal phosphate coated particle of a composite cathode active material.

It is important to note that variations in synthetic conditions can have dramatic effects on the uniformity of inorganic surface coatings. One variation used previously involved precipitating nanoparticles of the coating material, subsequently co-suspending them with cathode powder, then filtering and sintering at a relatively low temperature (400° C., 4 hrs) to keep the coating amorphous. TEM observations of an AlPO$_4$-coated LLNMC material prepared via this suspension method showed uneven deposition of AlPO$_4$ "agglomerates", resulting in areas of extremely thick (~200 μm) coating interspersed with bare surface (FIG. 16). This pattern suggested that adsorption of the AlPO$_4$ nanoparticles is kinetically controlled, and that an alternate synthesis procedure could provide a more controlled method of achieving uniform surface coatings. Thus, an in situ precipitation method was explored: the active material was suspended in a solution of the cationic component followed by subsequent addition of the anionic component, using drop-wise addition and rapid stirring to control the precipitation of small coating particles on the active material. The suspension was dried and sintered at the same temperature of 400° C. to ensure that the coating remained amorphous. It was found that maintaining rapid stirring during mixing and drying aided in achieving the best electrochemical performance. TEM observations of the AlPO$_4$-coated LLNMC material prepared using this in situ method confirmed the superiority of this procedure in its ability to apply a thin, even layer of AlPO$_4$ to the surface of the cathode particles (FIG. 17). This procedure was used for both coated materials to keep their treatments as consistent as possible, even though the borate coating does not precipitate at the initial concentration.

The tap densities of the pristine, AlPO$_4$-coated, and AlBO$_3$-coated materials were 1.97 g/cm$^3$, 1.88 g/cm$^3$, and 1.51 g/cm$^3$, respectively. A range of 1.4-1.8 g/cm$^3$ are common tap densities for these layered materials. ICP analyses of the pristine and coated materials are summarized in Table 1. The measured compositions of the base cathode powder and the wt % of coating material were consistent and in good agreement with the expected values. ICP analysis of separately prepared and isolated "AlBO$_3$" showed that this material contains a 1:1 ratio of Al:B.

X-Ray Diffraction.

Figure 5:
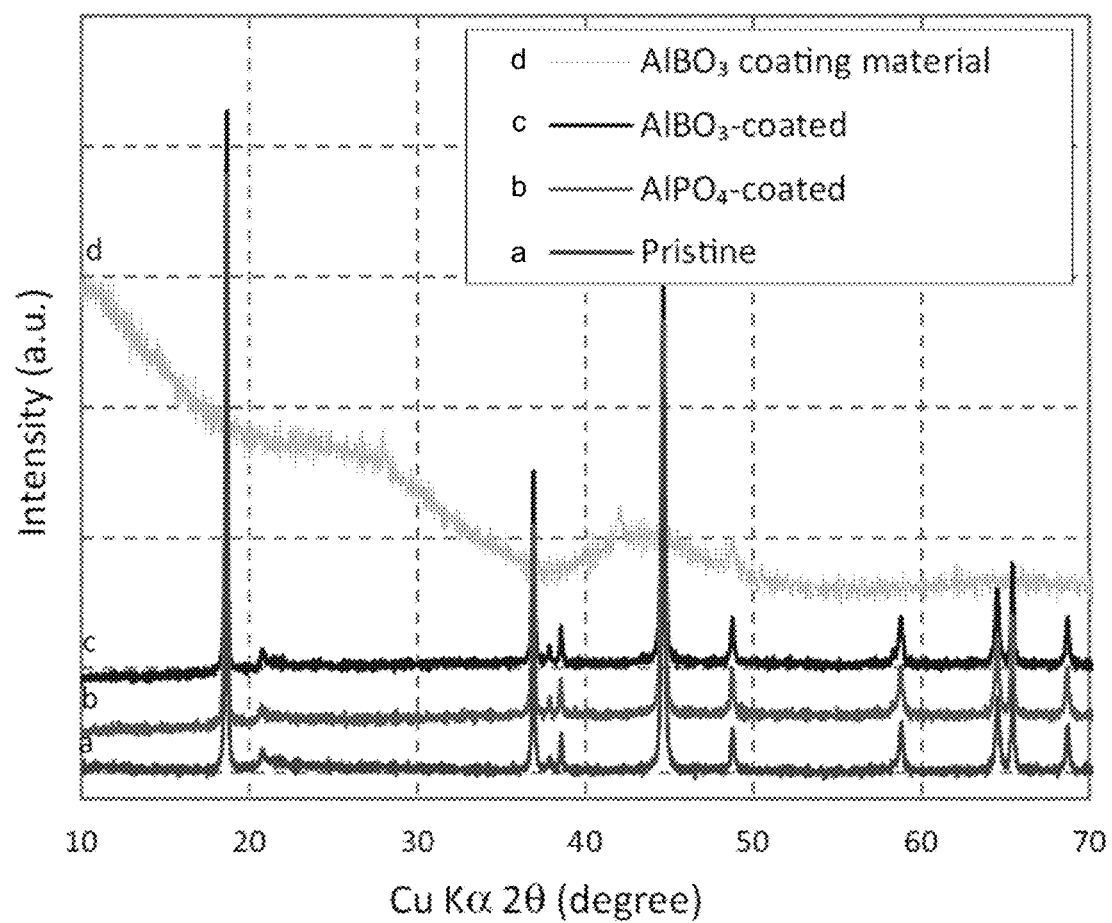
FIG. 5 provides x-ray diffraction (XRD) data for different cathode materials and a coating material.

FIG. 5 shows the X-Ray powder diffraction (XRD) patterns of the pristine, AlPO$_4$-coated, and AlBO$_3$-coated LLNMC cathode materials as well as the isolated AlBO$_3$ coating material. The XRD analyses of all three cathode materials were nearly identical and could easily be indexed to that expected for the Li$_2$MnO$_3$-LiMO$_2$ (M=Mn, Co, Ni) class of materials, demonstrating that the coating materials and methodology do not alter the structure of the base cathode material. The absence of coating-based artifacts in the XRD patterns is consistent with the small (2 wt %) amount of coating material. The diffraction pattern of pure "AlBO$_3$" prepared in the absence of cathode powder was generally broad and diffuse, consistent with production of an amorphous material at the sintering temperature of 400° C.

SEM Studies of Morphology and Elemental Composition.

Figure 6:
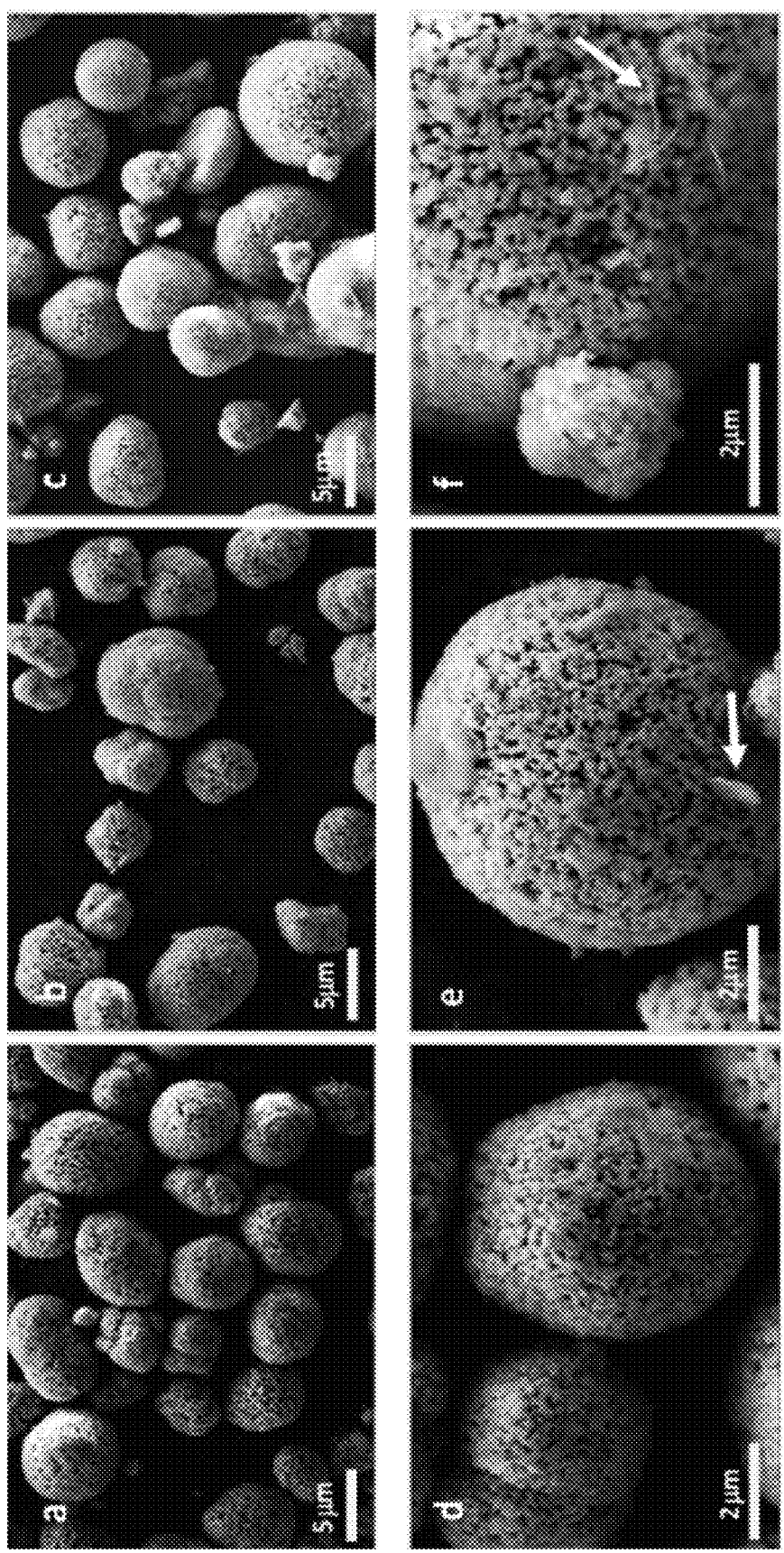
FIG. 6 provides scanning electron micrograph (SEM) images for different materials at different magnifications.

The morphologies of the powders were investigated by SEM and are shown in FIG. 6. In all cases, the cathode particles are spherical but finely micro-structured. The primary particles are crystals 100-200 nm in diameter. These primary particles agglomerate into spherical secondary particles between 6-10 μm in diameter, with an average diameter of approximately 8 μm. Application of an AlPO$_4$ or AlBO$_3$ inorganic coating does not appear to significantly agglomerate, disintegrate, or otherwise change the size distribution of these secondary particles (FIG. 6 panel a, panel b, panel c). However, small particles and fibers (see arrows) were observed to have been randomly deposited on the surfaces of some AlPO$_4$-coated (FIG. 6 panel e) and AlBO$_3$-coated samples (FIG. 6 panel f). Their enrichment in elements comprising these coatings (Al and either P or B) were confirmed by EDS (Table 2).

Figure 7:
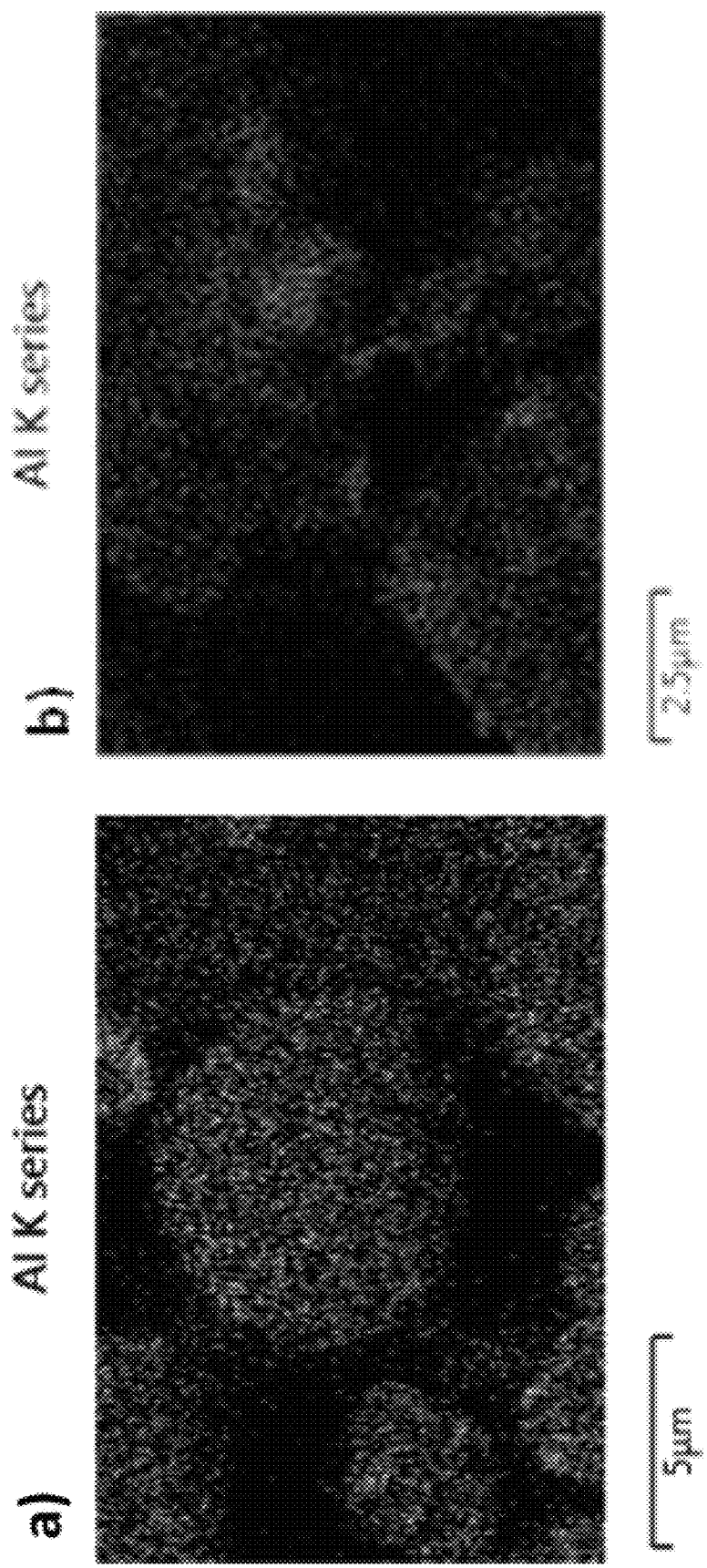
FIG. 7 provides scanning electron micrograph energy dispersive spectroscopy (SEM-EDS) mapping data an $AlPO_4$-coated particle and an $AlBO_3$-coated particle.

EDS mapping corrected for spectral overlap demonstrated even distribution of Al over the surfaces of the coated particles, even where a coating was not visually observed in the SEM image (FIG. 7). This suggested that the coating might be conformal despite the mixed morphology observed in SEM. However, the resolution of SEM/EDS mapping is insufficient to directly image this layer. Thus, both materials were further studied by TEM.

TEM Studies of AlPO$_4$- and AlBO$_3$-Coated Material.

Figure 8:
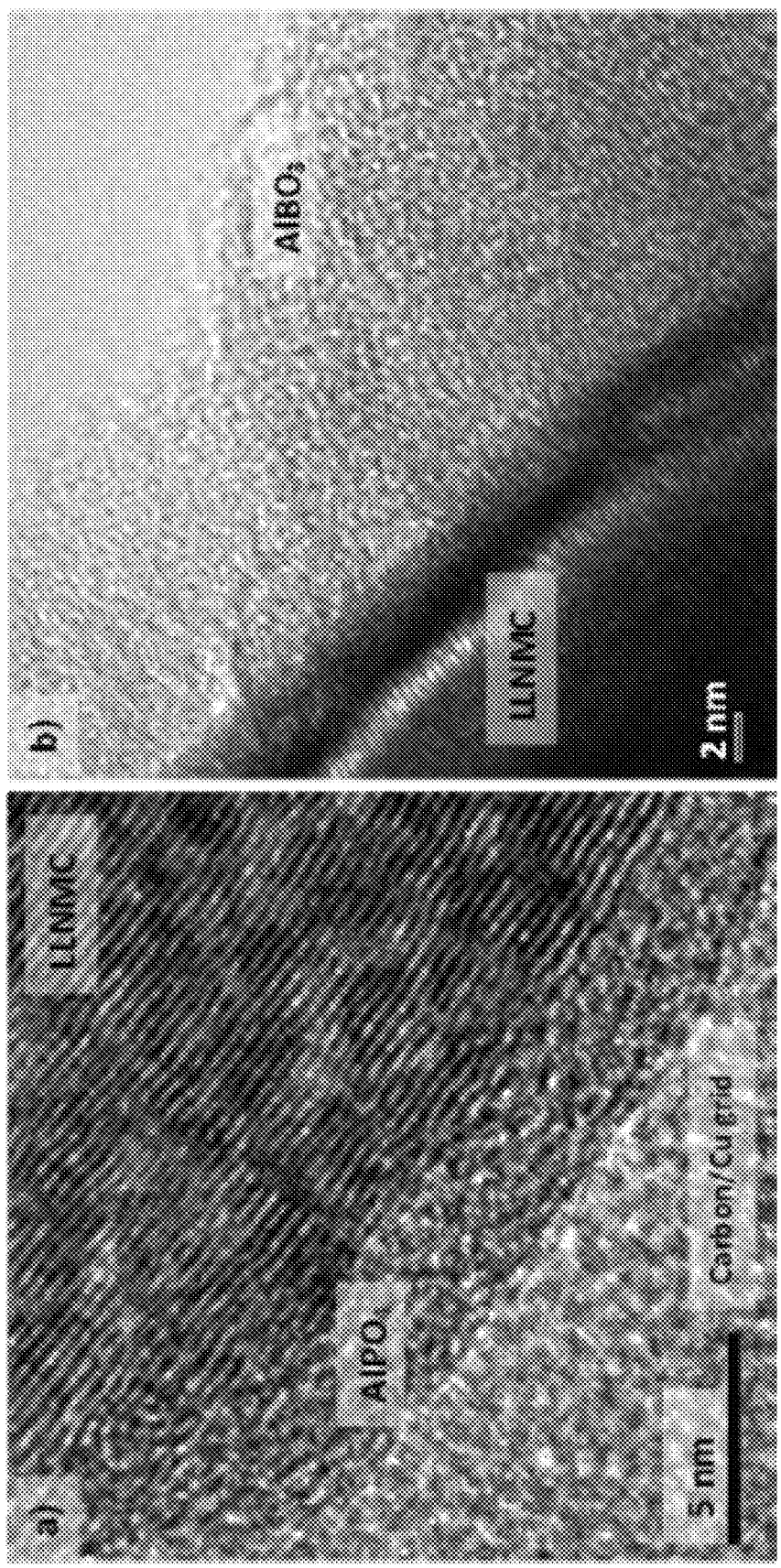
FIG. 8 provides high-resolution transmission electron microscopy (HRTEM) images of an $AlPO_4$-coated particle and an $AlBO_3$-coated particle.

High-resolution transmission electron micrograph (HR-TEM) images taken at the circumference of AlPO$_4$-coated and AlBO$_3$-coated particles are shown in FIG. 8 panels a and b, respectively. Both coatings are clearly visible at this level of magnification. The lines in the bulk regions of the particles are due to the lattice ordering of transition metal layers, which is highly characteristic of this class of layered-layered cathode material.

The AlPO$_4$ coating layer in FIG. 8 panel a is about 3 nm thick and can be recognized by its dissimilar, granular appearance and nonlayered internal structure. EDX of these regions detected Ni, Mn, Co, and O in the purported LLNMC region and Mn, Al, and P in the purported coating layer. No other elements were detected in the respective regions, indicating a clear difference in their compositions and a strong likelihood that Al/P-enrichment in the outer layer was due to the applied coating. The presence of Mn in this outer layer may indicate partial diffusion and/or trapping of Mn cations from the LLNMC in the coating layer during coating or sintering.

The AlBO$_3$ coating layer in FIG. 8 panel b has a similarly granular, amorphous structure and was also observed by EDX to be enriched in Al relative to the bulk. The thickness of the coating is slightly less uniform than in the AlPO$_4$-coated sample, ranging from 2 nm in some regions to >10 nm in others. It is unclear whether the more variable distribution of the AlBO$_3$ network arises during the solvent evaporation process or during sintering.

Figure 18:
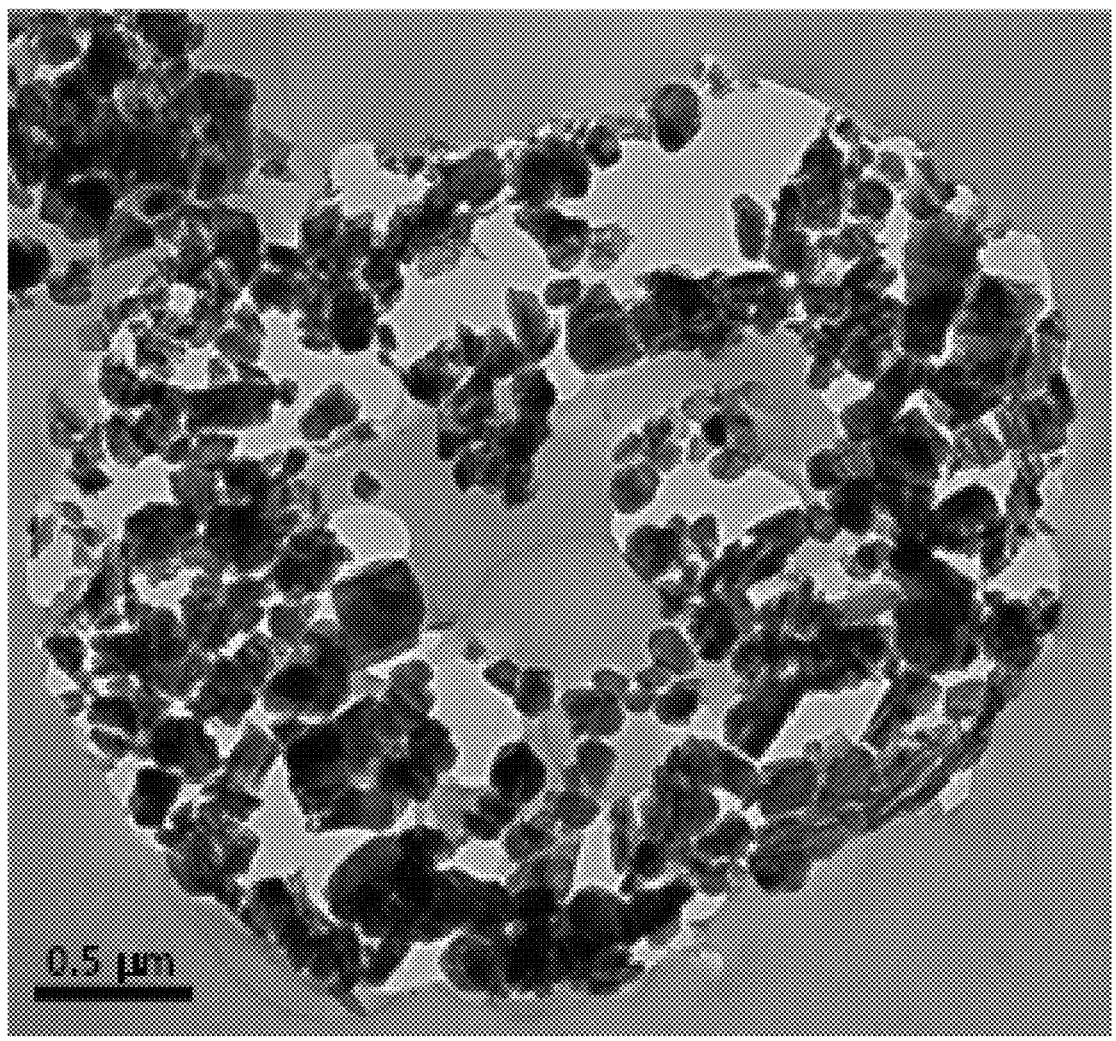
FIG. 18 provides a bright field cross sectional TEM image of a metal phosphate coated particle of a cathode active material.

Given the microcrystalline surface morphology observed in SEM and the fact that the high capacity LLNMC material used in this study is relatively new, we took the opportunity to investigate its internal structure by taking microtome slices of AlPO$_4$-coated particles embedded in epoxy. The bright field TEM image in FIG. 18 shows that these LLNMC materials are porous in a way that allows epoxy or electrolyte access to surfaces of the center of the particle, which are not as likely to be coated if the precipitation procedure is under kinetic control. Thus, although coverage on the outer surface of the particles appears to be fairly conformal, it appears that some uncoated cathode/electrolyte Li$^+$ diffusion boundaries are still present at the interior surfaces of these particular LLNMC materials. This demonstrates that the structural interplay between the coating and base cathode material is an important aspect of these coating studies and that the results of one study should not be generalized to all materials, even if they have the same nominal composition.

Electrochemical Performance.

Figure 9:
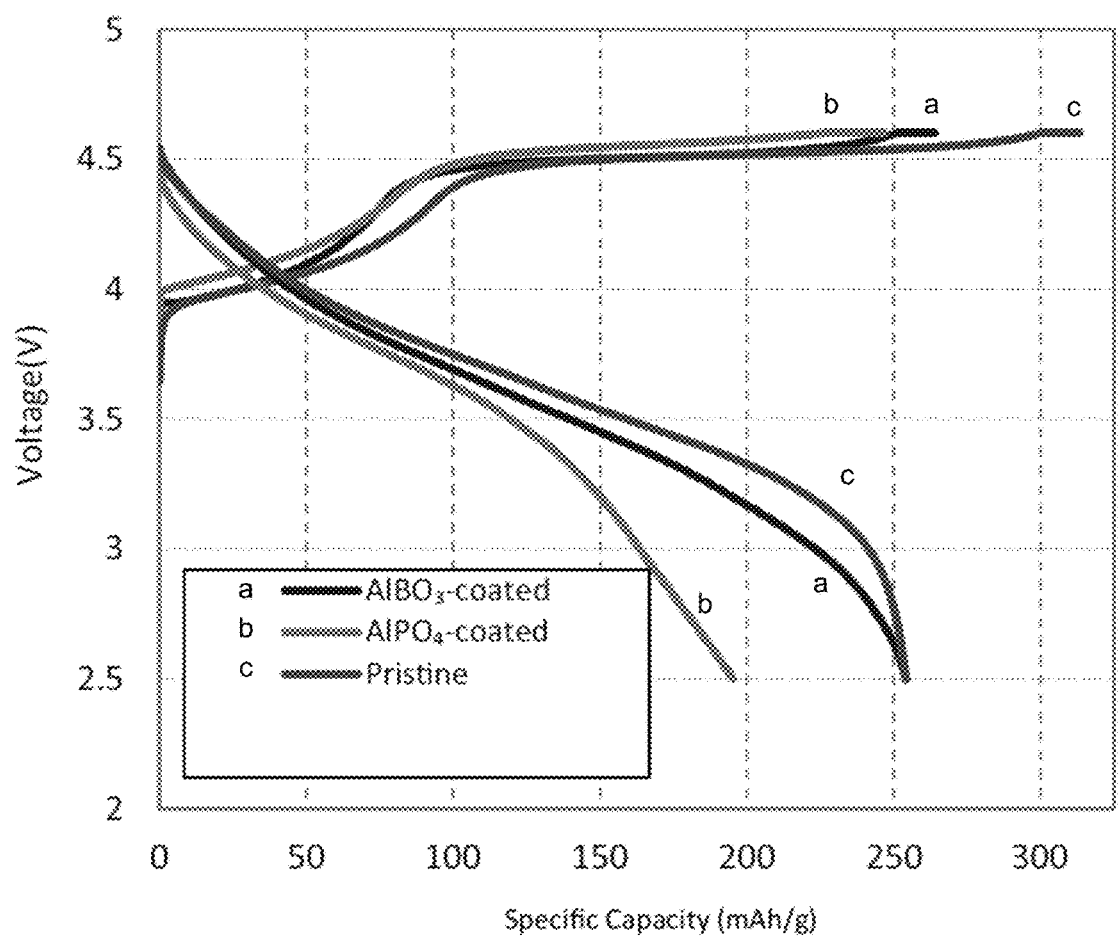
FIG. 9 provides data showing charge and discharge cycles for different cathode materials.

Initial charge and discharge voltage profiles at C/10 for all three materials in Li half-cells are shown in FIG. 9. The first cycle charge capacities of both coated materials (AlPO$_4$, 247 mAh/g; AlBO$_3$, 262 mAh/g) are lower than that of the pristine material (313 mAh/g). However, the pristine material exhibits the greatest irreversible capacity loss (61 mAh/g). Both inorganic coatings stabilize the capacity of the LLNMC cathode, but the AlBO$_3$-coated material exhibits the smallest irreversible capacity (7 mAh/g) of all three samples. The discharge performance of the AlBO$_3$-coated material is highly improved over that of the AlPO$_4$-coated material, which exhibits a much lower discharge capacity (195 mAh/g), as well as a steeper discharge slope (Table 3).

Figure 10:
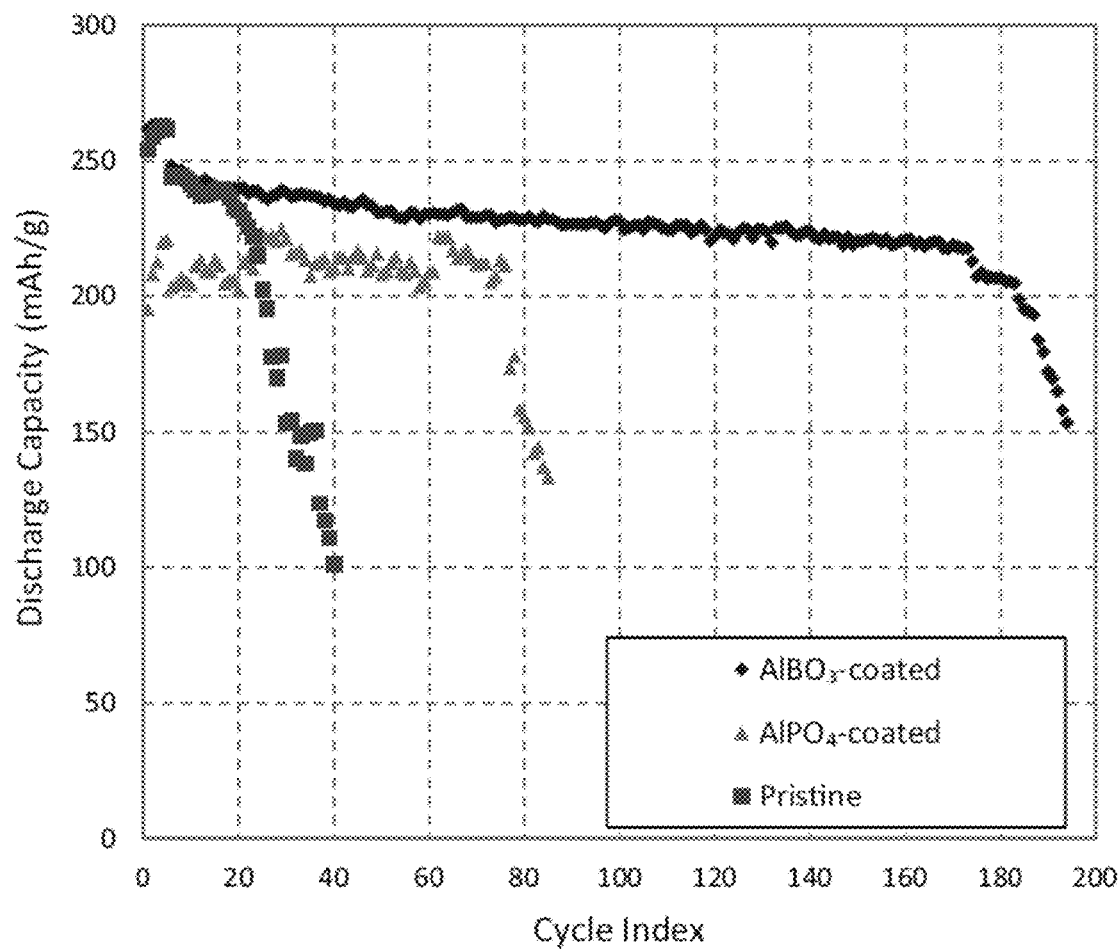
FIG. 10 provides data showing discharge capacity as a function of cycle for different cathode materials.

Long-term cycling studies at C/10 with 5 initial activation cycles between 2.5-4.6 V followed by long-term cycling between 2.5-4.5 V also show substantial differences in cycle life and capacity (FIG. 10). The AlBO$_3$-coated material shows the best cycle life, achieving and maintaining an initial discharge capacity above 240 mAh/g for about 50 cycles. After this, the material continues to exhibit a slow fade, achieving a total of 180 cycles above 200 mAh/g (80% capacity retention). The pristine, uncoated cathode material exhibits a similar initial capacity, but rapidly fails after only 25 cycles. The AlPO$_4$-coated material exhibits a comparatively lower initial capacity of about 210 mAh/g, which is maintained for 75 cycles until the material exhibits rapid capacity fade and cell failure. The AlBO$_3$-coated material thus exhibits the highest capacity and the best capacity retention. Again, the cycle lives reported here are for cells built to prototype loading specifications rather than the lower loadings that are more commonly reported in the literature.

Figure 19:
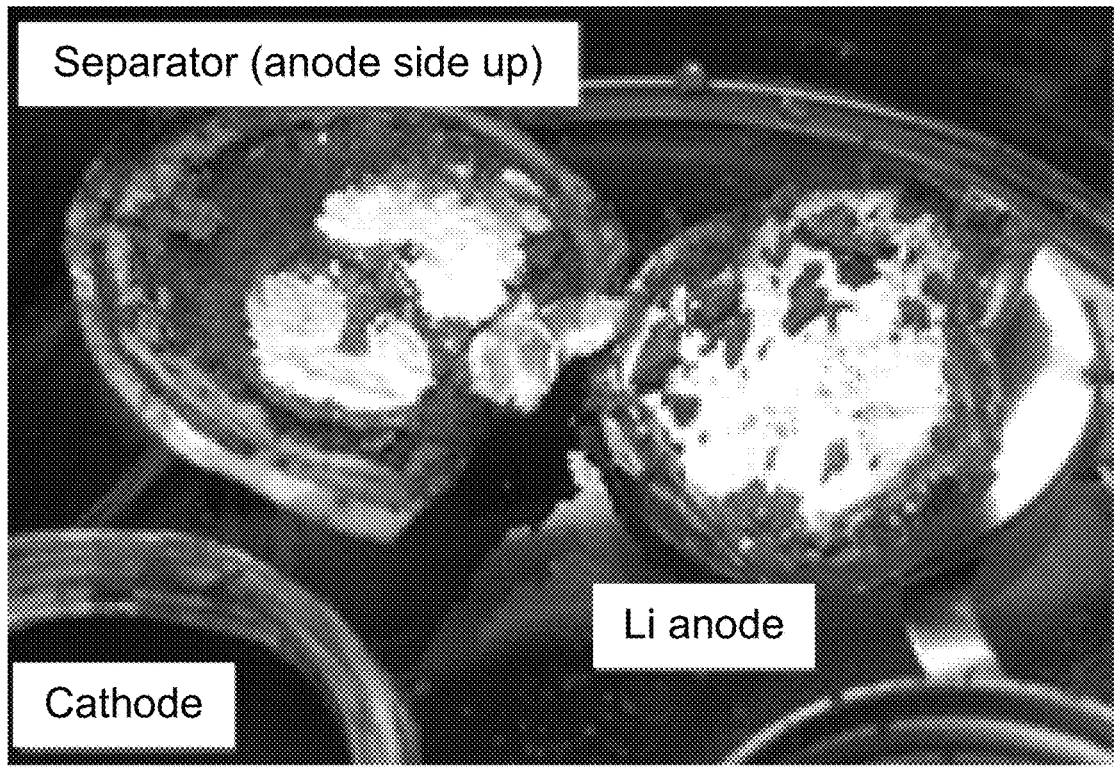
FIG. 19 provides an image of a failed electrochemical cell after deconstruction.
Figure 20:
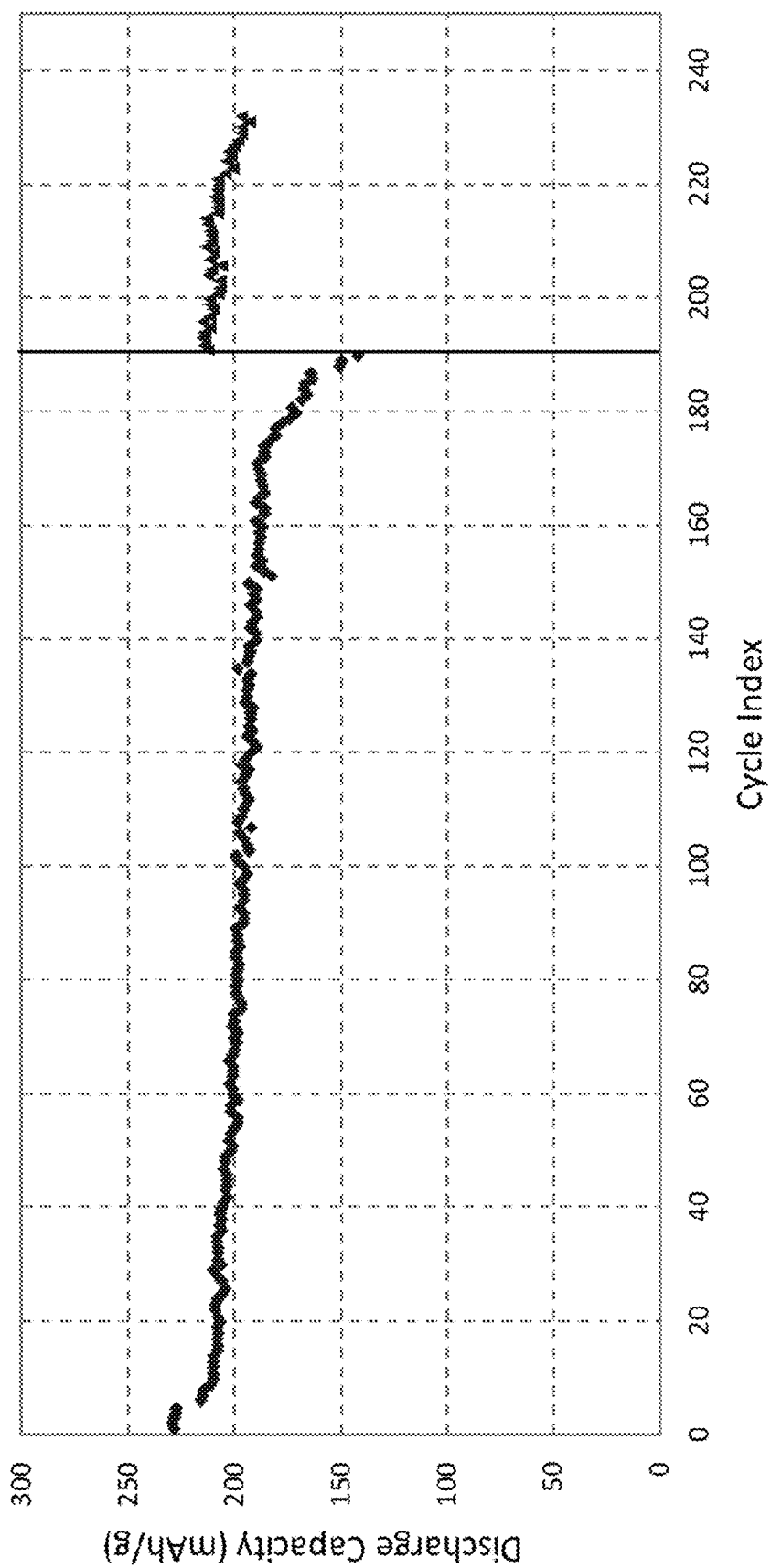
FIG. 20 provides a plot showing discharge capacity as a function of cycle number for an electrochemical cell in accordance with some embodiments.

Destructive physical analyses (DPA) were performed on cells with these three cathode materials at the end of their cycling tests. These analyses showed that cell failure was correlated with "cell drying", in which the electrolyte appears to have completely degraded, leaving a thick, pasty, water-reactive solid on surface of the Li anode facing the cathode (FIG. 19). This phenomenon was observed when prototype cells with LLNMC cathodes were attempted, and was correlated with subsequent formation of lithium dendrites. Interestingly, when the cathodes from these cells were harvested and placed into fresh cells, the cells resumed their normal cell cycling behavior at the capacity level observed prior to rapid fade and failure (FIG. 20). This demonstrates that the cathode materials are not severely degraded in their performance during cycling, and that the loss of electrolyte and the interfacial degradation at the anode may be responsible for the failure of these cells. The large increase in coin cell cycle life for the coated materials (70+ cycles for the coated materials vs. ~25 cycles for the pristine material) suggests that application of a surface coating appreciably slows this electrolyte decomposition failure mode.

The rate capacities of all three samples at room temperature (23° C.) were compared by subjecting cells to five C/20 formation cycles, then cycling at increasing rates between C/10 to 2 C before returning to C/10 (FIG. 11). The AlPO$_4$-coated material performs similarly to the pristine material at most rates. The AlBO$_3$-coated material yields the highest capacities at all rates. The superior rate capability of the AlBO$_3$-coated material is more strongly evident at high discharge rates; at 2 C the AlBO$_3$-coated material yields 55 mAh/g while the two others yield 20 mAh/g. The capacities of all three materials were fairly poor at high C-rates, consistent with other LLNMC cathodes. However, all three materials recovered immediately on the return to cycling at C/10, which suggests that cycling at high rates does not damage the LLNMC material.

Electrochemical Impedance Spectroscopy (EIS).

Figure 12:
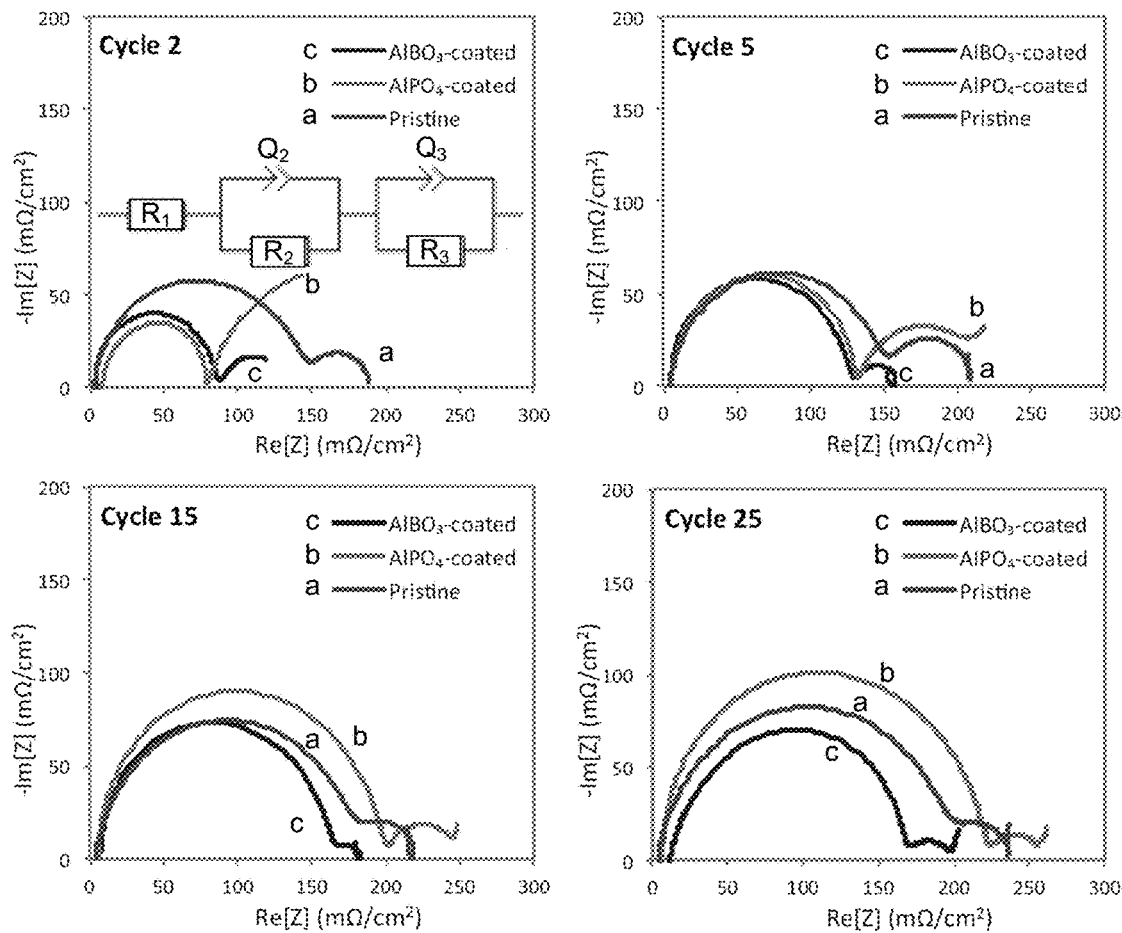
FIG. 12 provides electrochemical impedance spectroscopy (EIS) data for different cathode materials for four different cycle numbers.

EIS studies were carried out in three-electrode pouch cells over 25 cycles to see if the coatings have an effect on the initial electrochemical characteristics or their rate of change over time (FIG. 12). All studies were carried out at 4.3 V (approximately 80% SOC) at 25° C.

Complex plane EIS plots of the three materials over their cycle lives are composed of two semi-circles, suggesting that these systems can be interpreted using an equivalent circuit composed of a resistor and two resistor/constant phase element (CPE) relaxation loops, all in series. These correspond to: the sum of electronic resistance from the electrodes, leads, and electrolyte (resistor), the cathode/electrolyte interfacial film impedance (high-frequency R/CPE relaxation loop), and the charge transfer impedance (mid-to-low frequency R/CPE relaxation loop). The comparative values of R$_{CT}$ (charge transfer impedance) and R$_{SEI}$ (solid electrolyte interfacial film impedance) are shown graphically in FIG. 13. The R$_{SEI}$ (series resistance) values are uniformly low (<12 mΩ/cm$^2$) and constant for all materials throughout cycling. They are omitted from the graph for clarity, but are shown in Table 4.

R$_{CT}$ is initially higher (~75 mΩ/cm$^2$ vs. ~25 mΩ/cm$^2$) for the AlPO$_4$-coated material than the other two, but this value drops during cycling, and the materials exhibit similarly low charge transfer resistances around 25 mΩ/cm$^2$ at the end of 25 cycles. This decrease in the charge transfer resistance (R$_{CT}$) is uncommon and may be related to structural changes at the coated cathode surface. Gradual surface reconstruction in NMC cathodes may occur wherein the bulk layered structure in converted to a rock-salt/spinel mixed structure at the surface. It is likely that similar reconstruction phenomena occur in the Li-rich NMC cathode, and that the material exhibits different kinetics as the cycling continues and the structure changes. Another possible site of change is in the surface coating itself. Lithium from the bulk of cathode tends to diffuse to the surface and may react with the surface coating to form a less insulating coating (e.g., LiAlO$_2$ from Al$_2$O$_3$ coating). Given that the R$_{CT}$ values are low at all cycles for the other two materials, it may be useful to consider the $R_{CT}$ value for fresh AlPO$_4$-coated material to be higher than normal, suggesting that the AlPO$_4$ coating may be initially more insulating and that structural changes in the coating upon extended cycling reduce this insulating behavior.

The biggest differential and largest contribution to the impedance of these cathode materials comes from the cathode-electrolyte interphase ($R_{SEI}$). Initially, both the AlPO$_4$- and AlBO$_3$-coated materials demonstrate lower $R_{SEI}$ than the pristine material. The SEI resistance rises for all three materials during cycling, which can be attributed to SEI growth and thickening due to oxidative degradation of electrolyte at the cathode interface. Over time, the $R_{SEI}$ of the AlPO$_4$-coated cathode surpasses that of the pristine material, whereas the AlBO$_3$-coated cathode levels off and continues to maintain the lowest $R_{SEI}$ of the three materials. This suggests that the AlBO$_3$ coating is able to slightly reduce the rate and the extent of SEI formation, thereby improving electrolyte stability in high voltage environments.

Tafel Polarization.

Figure 14:
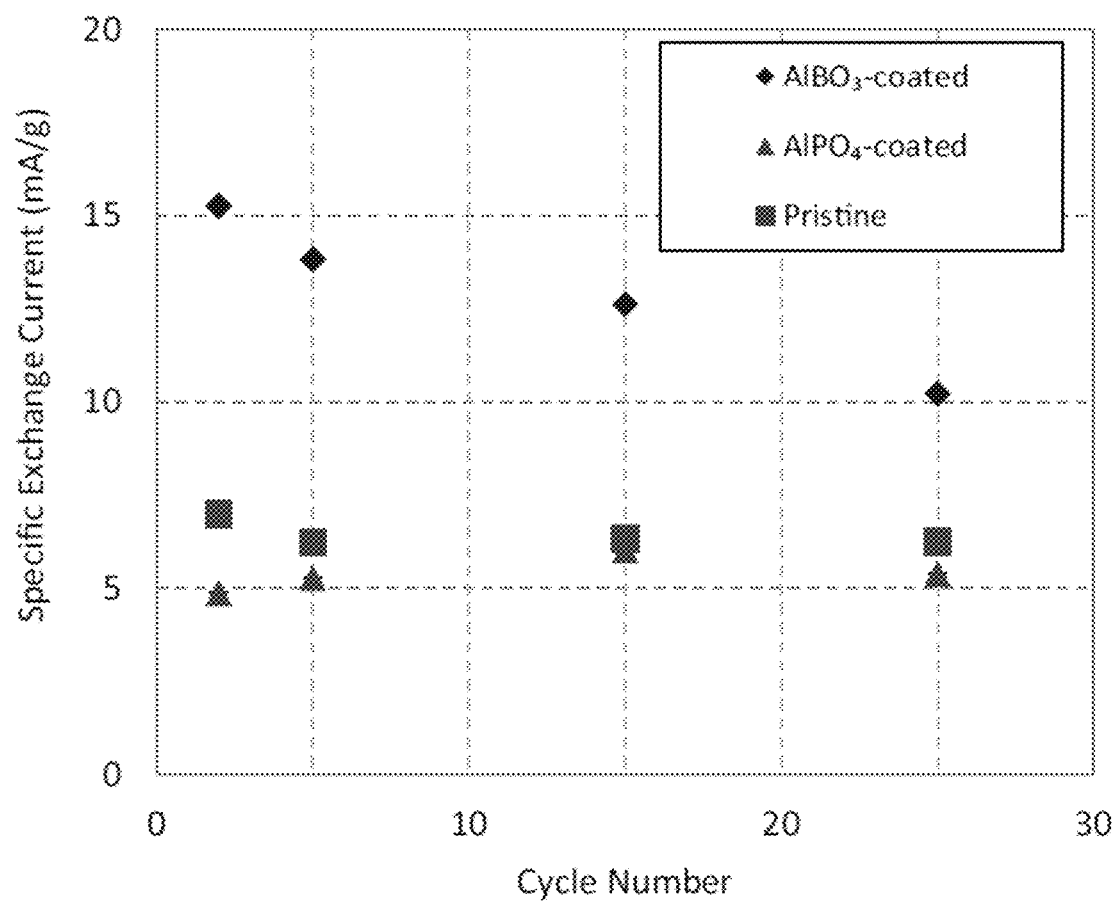
FIG. 14 provides data showing exchange currents as a function of cycle number for different cathode materials.

Tafel polarization studies were carried out in three-electrode pouch cells over 25 cycles to see if the coatings have an effect on the electrochemical kinetics or their rate of change over time. All studies were carried out at 4.3 V (approximately 80% SOC) at 25° C. These measurements were made under potentiodynamic conditions at slow scan rates of 0.5 mV/s, approximating steady-state conditions. The specific exchange currents were extracted from limiting current-corrected Tafel plots (FIG. 21) and are plotted vs. cycle number (FIG. 14). The AlPO$_4$-coated and pristine materials both maintain similar and constant values throughout the 25 cycles, in the range of 5-7 mA/g. This corresponds to an exchange current density of 0.07-0.1 mA/cm$^2$, which is consistent with the values from the EIS data. The AlBO$_3$-coated material, in comparison, initially exhibits a higher exchange current of approximately 15 mA/g. While this value decreases over 25 cycles to 10 mA/g, it is still twice that of the other samples. The high specific exchange currents exhibited by the AlBO$_3$-coated material suggests that this cathode composition provides an electrochemical environment that is comparatively more conducive to electron transfer reactions at room temperature, even as the materials age.

Diffusion Coefficients Using Potentiostatic Intermittent Titration Technique (PITT).

Figure 15:
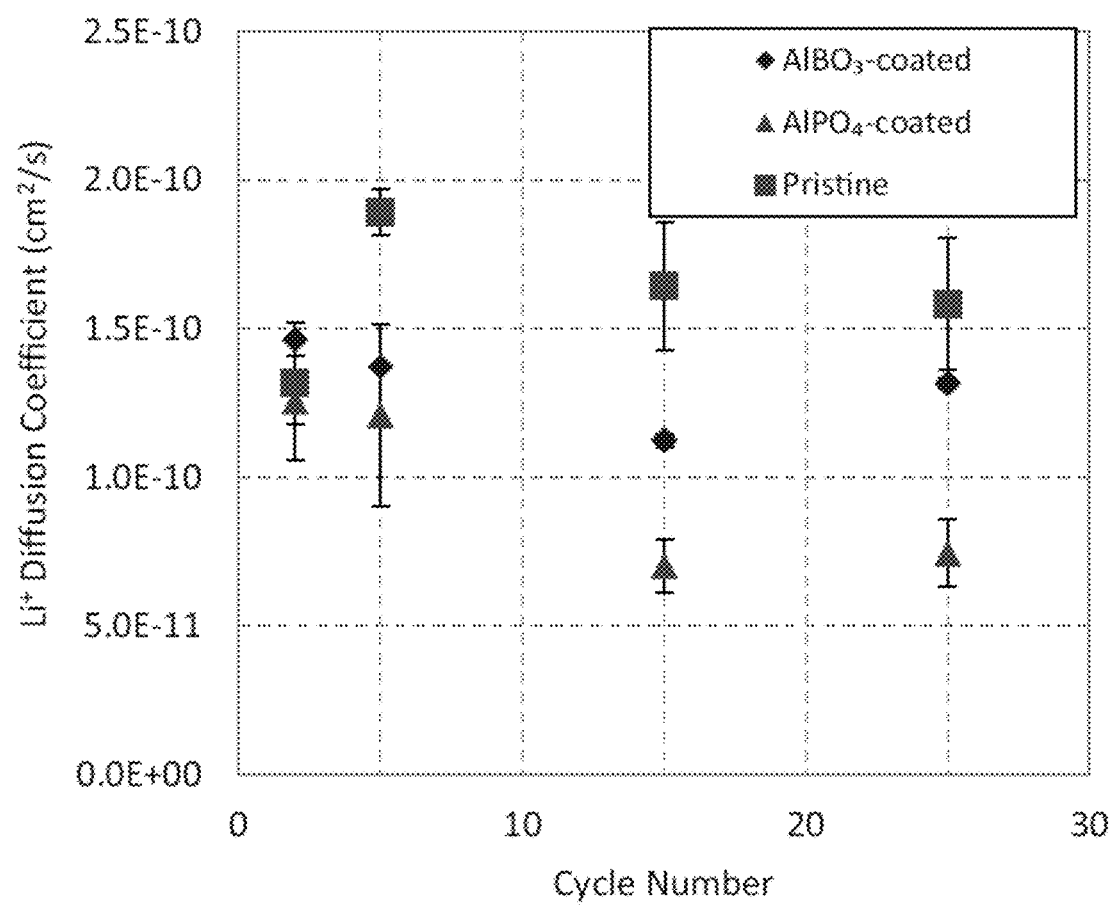
FIG. 15 provides data showing lithium ion diffusion coefficients as a function of cycle number for different cathode materials.

The PITT technique was used to measure the diffusion constant of Li$^+$ in all three materials to compare their initial values and evolutions over cycle life. All studies were carried out at 4.3 V (approximately 80% SOC) at 25° C. and the potential was stepped in increments of 10 mV. A plot of ln(I) vs. t during these steps was found to be linear. It was thus possible to treat the data by solving Fick's law for a semi-infinite system with a surface concentration perturbation:

$$I(t) = \frac{2Fa(C_S - C_0)D}{L} \exp\left(-\frac{\pi^2 Dt}{4L^2}\right) \quad [1]$$

where I(t) is current as a function of time, F is Faraday's constant, a is the electrode surface area, $C_S$-$C_0$ is the concentration change during the step, and L is the diffusion length, taken to be the particle radius (3 µm). The lithium diffusion coefficient D for each sample/cycle was then calculated using the long-time approximation (t>>L$^2$/D):

$$D = \frac{d\ln(I)}{dt} \frac{4L^2}{\pi^2} \quad [2]$$

where d ln(I)/dt is the slope of ln I vs. t plot and L is again the particle radius. The initial diffusion constants for all three materials were close, between 1.25-1.46×10$^{10}$ cm$^2$/s (FIG. 15). These values rose slightly for the pristine material after formation. In comparison, the values measured for the AlBO$_3$-coated material remained fairly constant while those for the AlPO$_4$-coated material dropped slightly over 25 cycles. It should be noted that the diffusion coefficients measured here pertain to the combined effect of diffusion through the surface film and the bulk of the cathode, and it is difficult to separate these two processes.

Overall, it appears that an AlBO$_3$ coating highly improves the cycling performance and stability of the LLNMC cathode. The irreversible capacities and cycle life of this new material are much increased over the pristine cathode as well as the AlPO$_4$-coated cathode. The rate capability of the AlBO$_3$-coated material is also slightly improved. This is consistent with EIS and Tafel measurements of all materials over multiple cycles, which show that the interfacial impedance is lower and the specific exchange currents are slightly higher for the AlBO$_3$-coated material. The coatings appear to have a neutral (AlBO$_3$-coated) to slightly negative (AlPO$_4$-coated) effect on Li$^+$ mobility according to PITT diffusion coefficient measurements at room temperature. Cells with uncoated (pristine) LLNMC cathodes sustained premature failure in half-cells during cycling. The cause of this failure was identified as cell drying and not the degradation of the cathode's structural or electrochemical properties; this "dry out" failure phenomenon may be unique to the LLNMC cathode.

Studies on other aluminum-based coatings suggest that it might be possible to further improve the performance of AlBO$_3$-coated NMC cathodes by optimizing the amount of coating as well as the sintering temperature.

CONCLUSIONS

An aluminum borate (AlBO$_3$)-based surface coating was applied to an LLNMC cathode material using a simple solution-based in situ precipitation procedure. SEM and TEM studies confirmed the success of this procedure in applying a thin coating layer to the outside surface of the LLNMC particles. However, cross-sectional TEM showed the existence of uncoated internal electrolyte/cathode interfaces in the LLNMC materials used in this study, demonstrating the unavoidable interplay between particle morphology, coating method, and coating efficacy. The AlBO$_3$ coating treatment was found to improve the cycle life of high active mass loading cells from 25 to 180 cycles with a high discharge capacity of 240 mAh/g at C/10, making it a substantially improved alternative to the pristine and AlPO$_4$-coated materials. The treatment was also found to have a smaller positive effect on the irreversible capacities and rate capacities of LLNMC. These performance improvements are attributed to a decrease in cathode surface electrolyte interface (SEI) resistance as well as an increase in electron transfer kinetics. Aluminum borate has thus emerged as a useful and effective surface coating for improving the cycling stability of high capacity Li-rich NMC cathodes at high voltages. This coating may also be advantageously used to increase the specific capacity of conventional cathode materials by improving their stability at high charge voltages.

Tables

TABLE 1

ICP analyses showing the elemental compositions of pristine and coated LLNMC materials.

| Material | Composition | Coating wt % |
|---|---|---|
| Pristine | $Li_{1.2}Mn_{0.53}Ni_{0.13}Co_{0.12}O_2$ | — |
| $AlPO_4$-coated | $Li_{1.2}Mn_{0.53}Ni_{0.13}Co_{0.12}O_2 \cdot 0.013(AlPO_4)$ | 1.9 |
| $AlBO_3$-coated | $Li_{1.2}Mn_{0.53}Ni_{0.13}Co_{0.13}O_2 \cdot 0.019(AlBO_3)$ | 1.9 |
| "$AlBO_3$" | $Al_{0.97}BO_3$ | — |

TABLE 2

Comparative amounts of elements detected by SEM-EDS on the overall surface of the particle vs. specific features (arrows) in $AlPO_4$-coated (FIG. 6 panel e) and $AlBO_3$-coated (FIG. 6 panel f) samples.

| $AlPO_4$-coated | | | | | | |
|---|---|---|---|---|---|---|
| Analysis site | O | Mn | Ni | Co | Al | P |
| Overall | 23.2 | 44.7 | 14.8 | 15.5 | 0.9 | 0.9 |
| Arrow | 50.9 | 7.3 | — | — | 8.2 | 31.5 |

| $AlBO_3$-coated | | | | | | |
|---|---|---|---|---|---|---|
| Analysis site | O | Mn | Ni | Co | Al | B |
| Overall | 36.8 | 39.9 | 9.9 | 9.9 | 0.6 | — |
| Arrow | 11.6 | 54.9 | 11.1 | 6.9 | 4.6 | 5.5 |

TABLE 3

First cycle charge, discharge, and irreversible capacities of representative cells of LLNMC cathode materials at C/10 between 2.5-4.6 V.

| Material | Charge Capacity (mAh/g) | Discharge Capacity (mAh/g) | Irreversible Capacity (mAh/g) |
|---|---|---|---|
| Pristine | 313 | 252 | 61 |
| $AlPO_4$-coated | 247 | 195 | 52 |
| $AlBO_3$-coated | 260 | 253 | 7 |

TABLE 4

Values of Ohmic, SEI and charge transfer resistances as a function of cycle number, as modeled from EIS data for pristine, $AlPO_4$-coated, and $AlBO_3$-coated cathode materials. All values are in milliohms, normalized by electrode area ($m\Omega/cm^2$).

| | Cycle 2 | | | | Cycle 5 | | |
|---|---|---|---|---|---|---|---|
| | $R_S$ | $R_{SEI}$ | $R_{CT}$ | | $R_S$ | $R_{SEI}$ | $R_{CT}$ |
| Pristine | 3.5 | 118 | 23.8 | Pristine | 3.8 | 149.3 | 52.3 |
| $AlPO_4$ | 9 | 69.5 | 77.3 | $AlPO_4$ | 6.8 | 125 | 55.5 |
| $AlBO_3$ | 3.8 | 82.5 | 21.5 | $AlBO_3$ | 5 | 124.5 | 23.3 |

TABLE 4-continued

Values of Ohmic, SEI and charge transfer resistances as a function of cycle number, as modeled from EIS data for pristine, $AlPO_4$-coated, and $AlBO_3$-coated cathode materials. All values are in milliohms, normalized by electrode area ($m\Omega/cm^2$).

| | Cycle 15 | | | | Cycle 25 | | |
|---|---|---|---|---|---|---|---|
| | $R_S$ | $R_{SEI}$ | $R_{CT}$ | | $R_S$ | $R_{SEI}$ | $R_{CT}$ |
| Pristine | 3.8 | 179.5 | 32 | Pristine | 3.8 | 186 | 34.5 |
| $AlPO_4$ | 6 | 191.3 | 38.8 | $AlPO_4$ | 6.5 | 212.3 | 29.5 |
| $AlBO_3$ | 6.8 | 160 | 9 | $AlBO_3$ | 11.5 | 158.3 | 16.3 |

FIGURE CAPTIONS

FIG. 5: XRD data of (a) pristine, (b) $AlPO_4$-coated, and (c) $AlBO_3$-coated cathode powders prior to cycling; (d) pure "$AlBO_3$" prepared in the absence of cathode powder.

FIG. 6: SEM images of (a, d) pristine, (b, e) $AlPO_4$-coated, and (c, f) $AlBO_3$-coated cathode powders at 5kX and 30kX magnification.

FIG. 7: SEM-EDS mapping data corrected for spectral overlap, showing an even distribution of Al over the surface of (a) the $AlPO_4$-coated particle and (b) the $AlBO_3$-coated particle.

FIG. 8: (a) HRTEM (490kX) image of an AlPO4 coating layer on LLNMC, (b) HRTEM (790 kX) image of an $AlBO_3$ coating layer on LLNMC.

FIG. 9: First cycle charge and discharge curves (at C/10) of $AlBO_3$-coated, $AlPO_4$-coated, and pristine cathodes between 4.6-2.5 V in coin half-cells.

FIG. 10: Cycle life and capacity stability of coin-format Li half cells with $AlBO_3$-coated, $AlPO_4$-coated, and pristine cathodes at C/10 between 4.6-2.5 V (first five cycles) and 4.5-2.5 V (long term).

Figure 11:
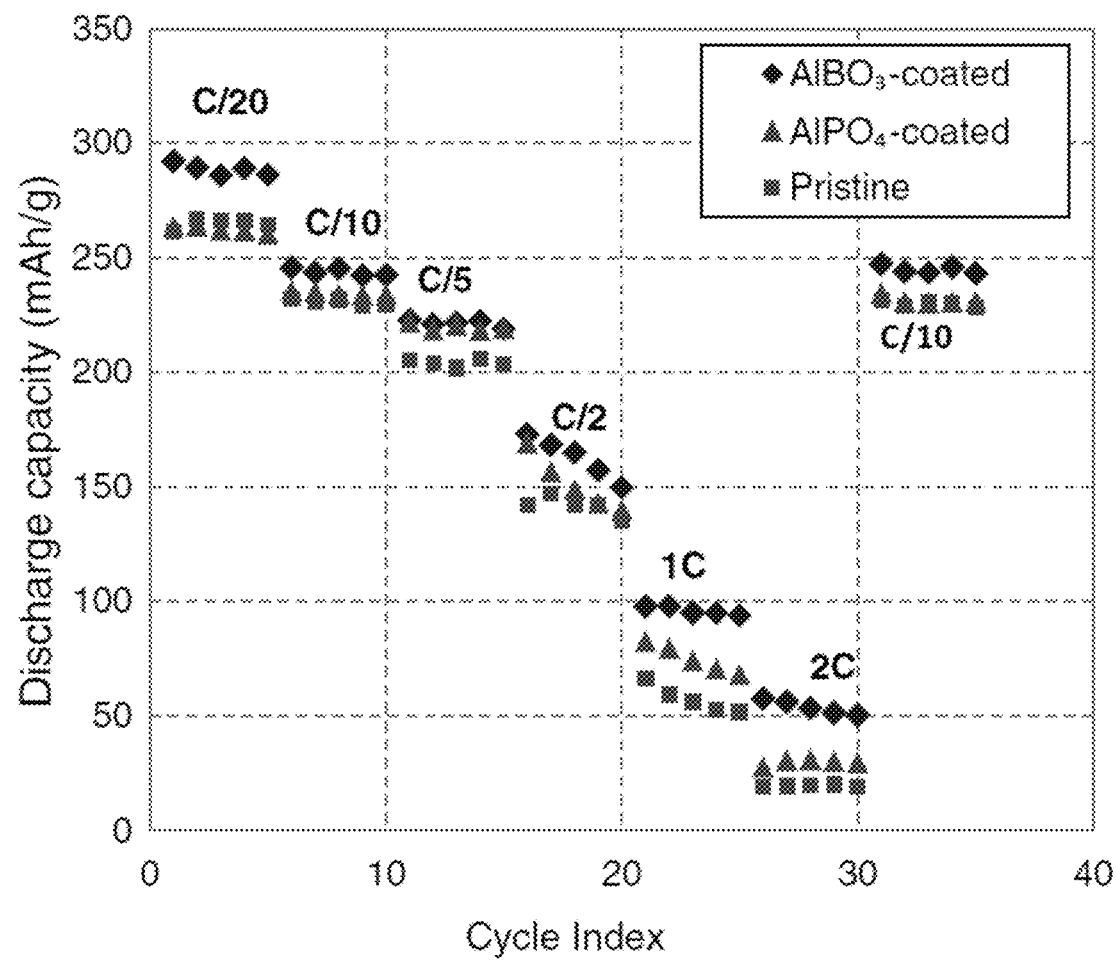
FIG. 11 provides data showing discharge capacity for different cathode materials at different discharge rates.

FIG. 11: Rate capacity of $AlBO_3$-coated, $AlPO_4$-coated, and pristine cathodes.

FIG. 12: EIS data for pristine, $AlPO_4$-coated, and $AlBO_3$-coated cathode materials in 3-electrode pouch cells after 2, 5, 15, and 25 cycles.

Figure 13:
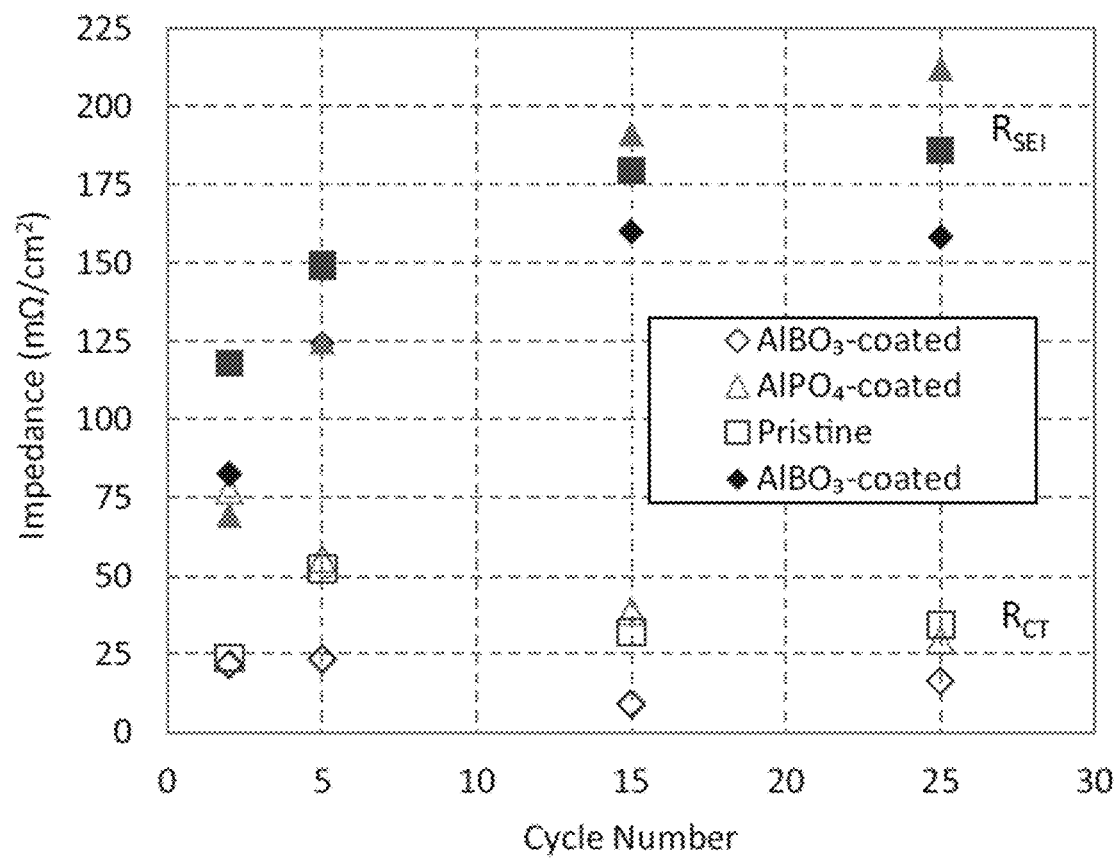
FIG. 13 provides data showing charge transfer impedance and solid electrolyte interfacial film impedance for different cathode materials.

FIG. 13: $R_{CT}$ (outlinemarkers) and $R_{SEI}$ (solid markers) calculated from EIS data as a function of cycle number for pristine, $AlPO_4$-coated, and $AlBO_3$-coated cathode materials.

FIG. 14: Exchange currents from Tafel polarization data as a function of cycle number of pristine, $AlPO_4$-coated, and $AlBO_3$-coated cathode materials.

FIG. 15: PITT data as a function of cycle number for all three materials in 3-electrode pouch cells.

FIG. 16: TEM micrograph of an LLNMC particle coated with AlPO4, prepared by separately precipitating AlPO4 prior to mixing with cathode material.

FIG. 17: TEM micrograph of an LLNMC particle coated with AlPO4, prepared by precipitating $AlPO_4$ with cathode material in situ.

FIG. 18: Bright field cross-sectional TEM image (5.9kX) of an in situ $AlPO_4$-coated cathode particle.

FIG. 19: DPA autopsy of LLNMC-Li coin cells (in this case of pristine, uncoated material) showing buildup of a powdery grey solid on the Li anode.

FIG. 20: Cycling data for an $AlBO_3$-coated cathode cycled vs. Li in a coin cell. The cell was observed to fail at 185 cycles (vertical line). The cathode was subsequently replaced into a new cell with fresh Li anode, where it resumed cycling at a high capacity.

Figure 21:
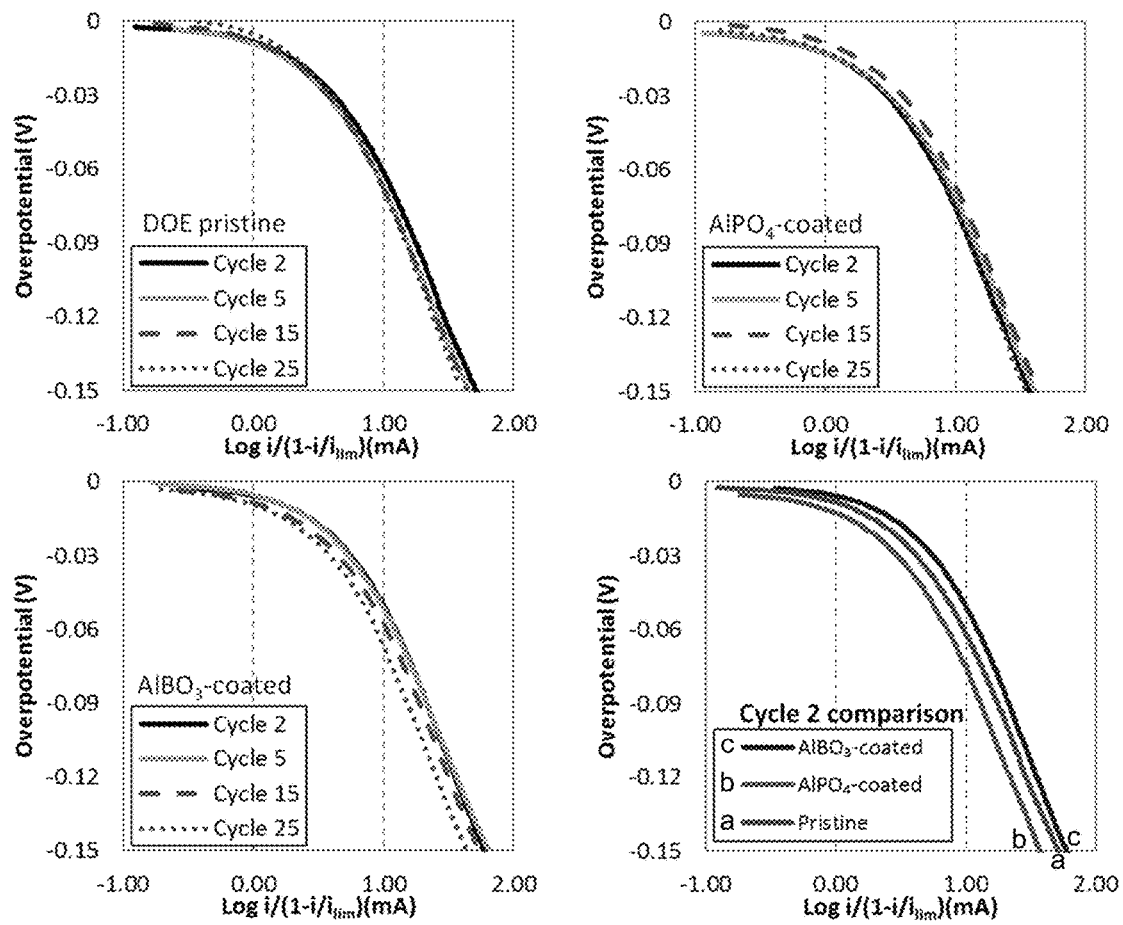
FIG. 21 provides plots showing limiting current-corrected Tafel polarization plots for different cathode materials.

FIG. 21: Limiting current-corrected Tafel polarization plots for pristine, AlPO$_4$-coated, and AlBO$_3$-coated materials over 25 cycles.

Additional details may be provided in Journal of The Electrochemical Society, 162 (12) A2259-A2265 (2015) and its supporting information, which are hereby incorporated by reference in their entireties.

Although the foregoing invention has been described in some detail by way of illustration and example for purposes of clarity of understanding, one of skill in the art will appreciate that certain changes and modifications may be practiced within the scope of the appended claims. In addition, each reference provided herein is incorporated by reference in its entirety to the same extent as if each reference was individually incorporated by reference. Where a conflict exists between the instant application and a reference provided herein, the instant application shall dominate.

What is claimed is:

1. A composite cathode material comprising:
   a cathode active material; and
   an aluminum borate, AlBO$_3$, compound coating the cathode active material, thereby forming an aluminum borate compound coating as a thin film over the cathode active material.

2. The composite cathode material of claim 1, wherein the cathode active material comprises lithium and one or more of manganese, nickel, magnesium, aluminum, and cobalt.

3. The composite cathode material of claim 1, wherein the cathode active material comprises crystalline particles having cross-sectional dimensions selected from the range of 50 nm to 500 nm.

4. The composite cathode material of claim 1, wherein the cathode active material comprises agglomerates of crystalline particles, wherein the agglomerates have cross sectional dimensions selected from the range of 1 µm to 20 µm.

5. The composite cathode material of claim 1, wherein the aluminum borate compound coating has a thickness selected from the range of 0.5 nm to 20 nm.

6. The composite cathode material of claim 1, wherein the aluminum borate compound is formed by a precipitation reaction between aluminum cations and borate anions.

7. The composite cathode material of claim 1, wherein the aluminum borate compound coating provides a protective barrier against oxidative degradation of an electrolyte in contact with the composite cathode material when the cathode active material is charged using a voltage greater than 4.2 V.

8. The composite cathode material of claim 1, wherein the aluminum borate compound coating comprises a percentage of the composite cathode material, by weight, of between 1% and 3%.

9. The composite cathode material of claim 1, provided in the form of an electrode comprising an aggregate of a plurality of particles of the cathode active material each coated with the aluminum borate compound.

10. A method of making a composite cathode material of claim 1, comprising:
    forming a reaction mixture by adding a cathode active material, a cation precursor, and an anion precursor to a solvent thereby initiating a precipitation reaction between the cation precursor and the anion precursor to form the composite cathode material, wherein the composite cathode material comprises the cathode active material and an aluminum borate coating on the cathode active material, wherein:
    the cation precursor comprises an aluminum salt, and
    the anion precursor comprises borate anions.

11. The method of claim 10, wherein forming the reaction mixture comprises:
    adding the cathode active material to the solvent to form suspended cathode active material in the solvent;
    adding the cation precursor to the solvent, thereby forming a solution containing metal cations and suspended cathode active material; and
    adding the anion precursor to the solution.

12. The method of claim 11, wherein adding the anion precursor to the solution comprises adding the anion precursor to the solution drop-wise while continuously stirring the solution.

13. The method of claim 10, further comprising:
    forming the composite cathode material into an electrode.

14. The method of claim 13, further comprising:
    assembling an electrochemical cell using the electrode, wherein the electrochemical cell comprises:
    a cathode comprising the electrode;
    an anode;
    a separator positioned between the anode and the cathode; and
    an electrolyte positioned between the anode and the cathode and in contact with the separator.

15. The method of claim 14, further comprising charging the electrochemical cell by applying a charging voltage between the cathode and the anode, wherein the charging voltage is greater than 4.2 V.

16. The method of claim 13, wherein forming the composite cathode material into an electrode comprises:
    applying a slurry comprising the composite cathode material to a current collector; and
    drying the slurry, thereby forming the electrode.

17. An electrochemical cell comprising:
    an anode;
    a cathode;
    a separator positioned between the anode and the cathode; and
    an electrolyte positioned between the anode and the cathode and in contact with the separator;
    wherein the cathode comprises:
    a cathode active material; and
    an aluminum borate coating over the cathode active material, thereby forming an aluminum borate compound coating as a thin film over the cathode active material.

18. The electrochemical cell of claim 17, wherein a voltage difference between the anode and the cathode is greater than 4.2 V.

* * * * *